(12) United States Patent
Sawa

(10) Patent No.: US 9,888,182 B2
(45) Date of Patent: Feb. 6, 2018

(54) DISPLAY APPARATUS

(71) Applicant: Olympus Corporation, Shibuya-ku, Tokyo (JP)

(72) Inventor: Yasutaka Sawa, Fuchu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/211,107

(22) Filed: Mar. 14, 2014

(65) Prior Publication Data

US 2014/0267869 A1 Sep. 18, 2014

(30) Foreign Application Priority Data

Mar. 15, 2013 (JP) .................................. 2013-054253

(51) Int. Cl.
*H04N 5/232* (2006.01)

(52) U.S. Cl.
CPC ..... *H04N 5/23293* (2013.01); *H04N 5/23203* (2013.01); *H04N 5/23212* (2013.01)

(58) Field of Classification Search
CPC ................................................ H04N 5/23293
USPC .................................................... 348/333.03
See application file for complete search history.

(56) References Cited

U.S. PATENT DOCUMENTS

| 2010/0045854 A1* | 2/2010 | Cheng et al. | 348/371 |
|---|---|---|---|
| 2010/0208057 A1* | 8/2010 | Meier et al. | 348/135 |
| 2012/0027393 A1* | 2/2012 | Tsuda | H04N 5/23212 396/102 |
| 2012/0057062 A1* | 3/2012 | Hamada et al. | 348/333.02 |
| 2012/0274762 A1* | 11/2012 | Hu et al. | 348/135 |
| 2013/0076959 A1* | 3/2013 | Yamagata et al. | 348/333.01 |
| 2014/0211066 A1 | 7/2014 | Hamada et al. | |

FOREIGN PATENT DOCUMENTS

| CN | 102348058 | 2/2012 |
|---|---|---|
| CN | 102402103 | 4/2012 |
| JP | 2007-114414 | 5/2007 |
| JP | 2008-256826 | 10/2008 |
| JP | 2010-091669 | 4/2010 |
| JP | 2010-093422 | 4/2010 |
| JP | 2010-177741 | 8/2010 |
| JP | 2012-177929 | 9/2012 |

OTHER PUBLICATIONS

Office Action to corresponding Japanese Patent Application No. 2013-054253, dated Sep. 20, 2016 (5 pgs.).
Office Action to corresponding Chinese Patent Application No. 2014-10096295.7, dated Nov. 30, 2016 (10 pgs.).

* cited by examiner

*Primary Examiner* — Twyler Haskins
*Assistant Examiner* — Fayez Bhuiyan
(74) *Attorney, Agent, or Firm* — John C. Pokotylo; Pokotylo Patent Services

(57) ABSTRACT

A display apparatus is provided with an information acquisition unit which obtains a current focusing position and a display control unit which generates display data for displaying a focus aid. The focus aid indicates a focusing range and current focusing position, and is displayed in a captured image, such as a live view image.

13 Claims, 21 Drawing Sheets

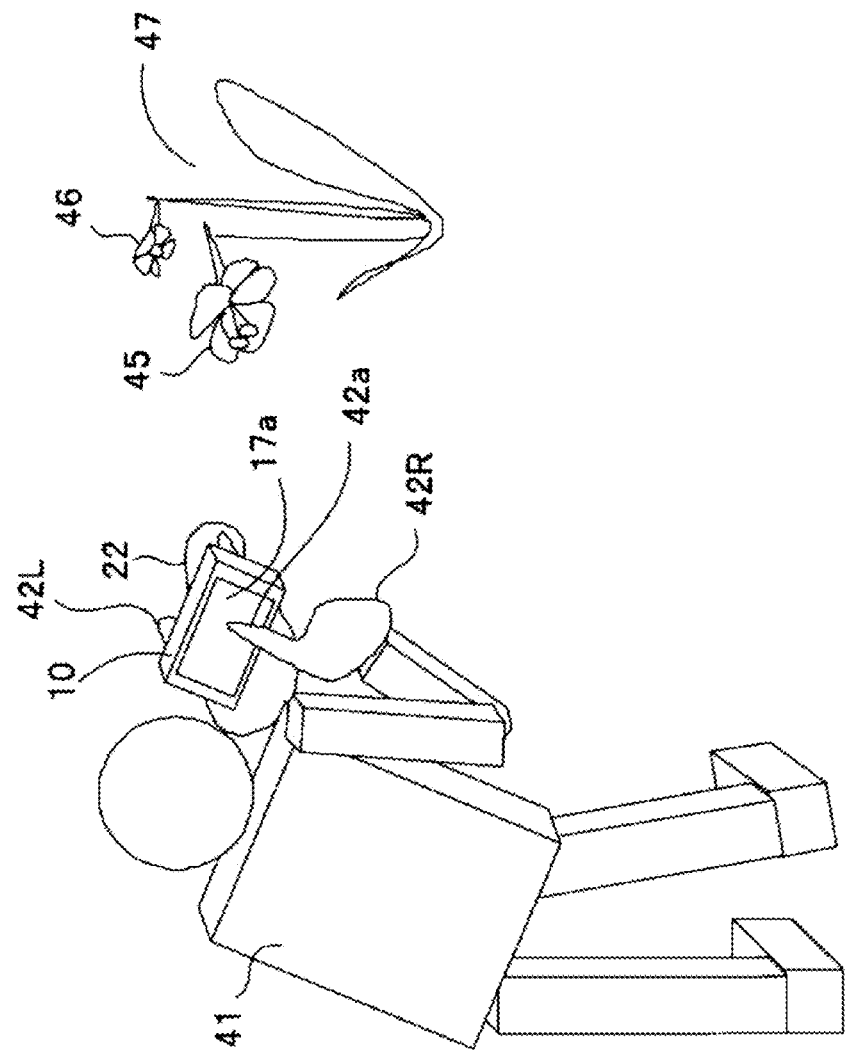

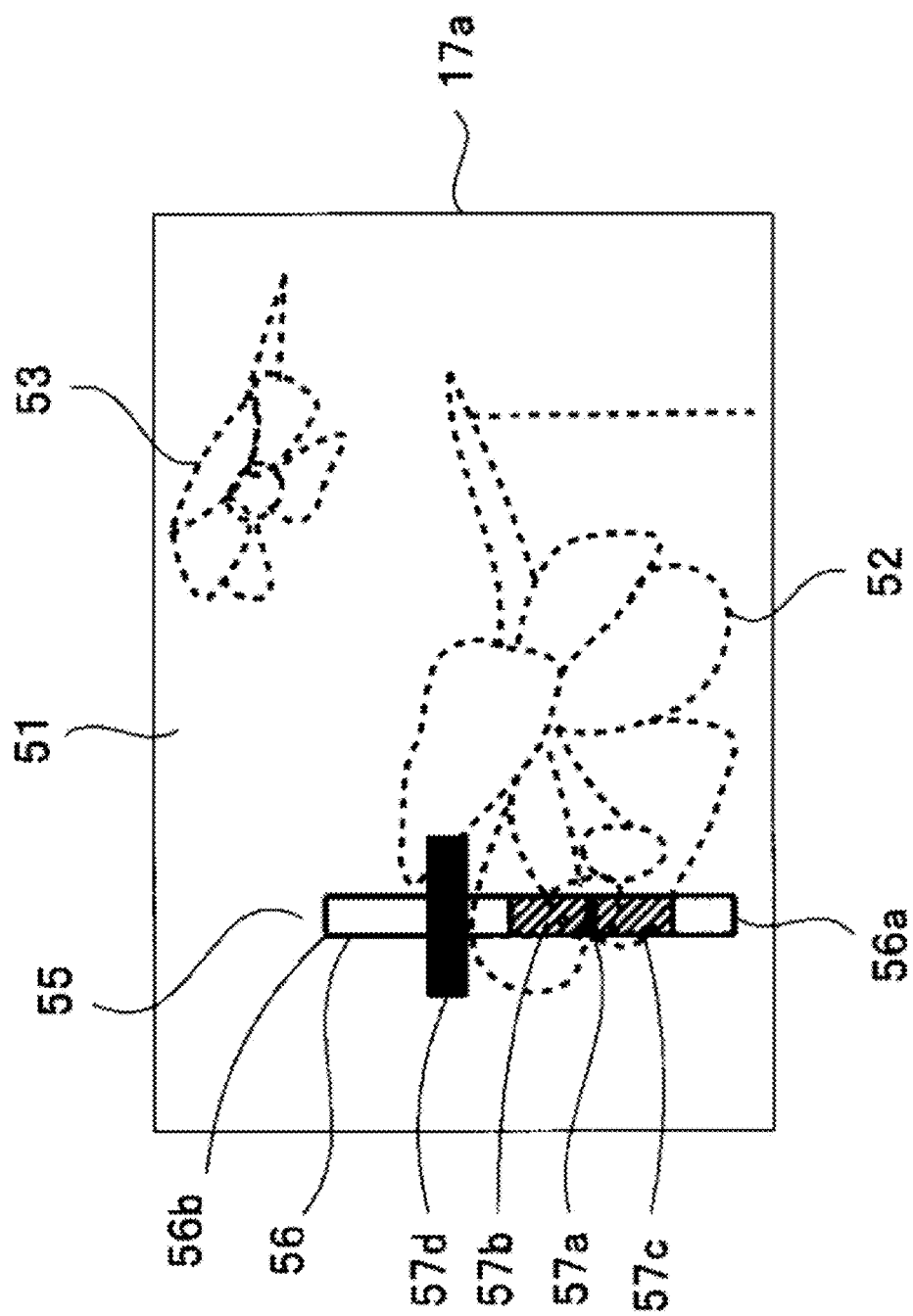

FIG.8

| Focal distance (On 35 mm camera) | 14 mm 28 mm | | 17 mm 34 mm | | 25 mm 50 mm | | 42 mm 84 mm | | 50 mm 100 mm | | 100 mm 200 mm | |
|---|---|---|---|---|---|---|---|---|---|---|---|---|
| Aperture | Range where in-focus state can be achieved (m) | Depth of field (m) | Range where in-focus state can be achieved (m) | Depth of field (m) | Range where in-focus state can be achieved (m) | Depth of field (m) | Range where in-focus state can be achieved (m) | Depth of field (m) | Range where in-focus state can be achieved (m) | Depth of field (m) | Range where in-focus state can be achieved (m) | Depth of field (m) |
| F1.4 | 3.136 ~ 12.331 | 9.195 | 3.563 ~ 8.378 | 4.815 | 4.214 ~ 6.146 | 1.932 | 4.690 ~ 5.354 | 0.663 | 4.777 ~ 5.244 | 0.497 | 4.942 ~ 5.059 | 0.117 |
| F1.8 | 2.834 ~ 21.219 | 18.385 | 3.293 ~ 10.382 | 7.089 | 4.033 ~ 6.576 | 2.543 | 4.609 ~ 5.464 | 0.855 | 4.717 ~ 5.318 | 0.601 | 4.928 ~ 5.078 | 0.15 |
| F2 | 2.704 ~ 33.177 | 30.473 | 3.173 ~ 11.792 | 8.62 | 3.948 ~ 6.815 | 2.867 | 4.568 ~ 5.521 | 0.952 | 4.668 ~ 5.357 | 0.688 | 4.916 ~ 5.085 | 0.167 |
| F2.8 | 2.284 ~ ∞ | | 2.768 ~ 25.825 | 23.057 | 3.642 ~ 7.973 | 4.331 | 4.417 ~ 5.761 | 1.345 | 4.574 ~ 5.514 | 0.94 | 4.888 ~ 5.119 | 0.233 |
| F4 | 1.853 ~ ∞ | | 2.323 ~ ∞ | | 3.262 ~ 10.699 | 7.437 | 4.206 ~ 6.163 | 1.957 | 4.412 ~ 5.768 | 1.356 | 4.839 ~ 5.172 | 0.333 |
| F5.6 | 1.480 ~ ∞ | | 1.914 ~ ∞ | | 2.864 ~ 19.986 | 19.801 | 3.955 ~ 6.796 | 2.841 | 4.214 ~ 6.146 | 1.932 | 4.777 ~ 5.244 | 0.467 |
| F8 | 1.137 ~ ∞ | | 1.513 ~ ∞ | | 2.421 ~ ∞ | | 3.630 ~ 8.032 | 4.402 | 3.948 ~ 6.815 | 2.867 | 4.688 ~ 5.357 | 0.669 |
| F11 | 0.882 ~ ∞ | | 1.200 ~ ∞ | | 2.029 ~ ∞ | | 3.292 ~ 10.395 | 7.104 | 3.660 ~ 7.889 | 4.229 | 4.561 ~ 5.504 | 0.923 |
| F16 | 0.641 ~ ∞ | | 0.892 ~ ∞ | | 1.597 ~ ∞ | | 2.848 ~ 20.402 | 17.553 | 3.262 ~ 10.699 | 7.437 | 4.412 ~ 5.768 | 1.356 |
| F22 | 0.463 ~ ∞ | | 0.682 ~ ∞ | | 1.272 ~ ∞ | | 2.453 ~ ∞ | | 2.866 ~ 18.687 | 15.801 | 4.226 ~ 6.121 | 1.895 |
| F32 | 0.343 ~ ∞ | | 0.489 ~ ∞ | | 0.950 ~ ∞ | | 1.992 ~ ∞ | | 2.421 ~ ∞ | | 3.948 ~ 6.815 | 2.867 |

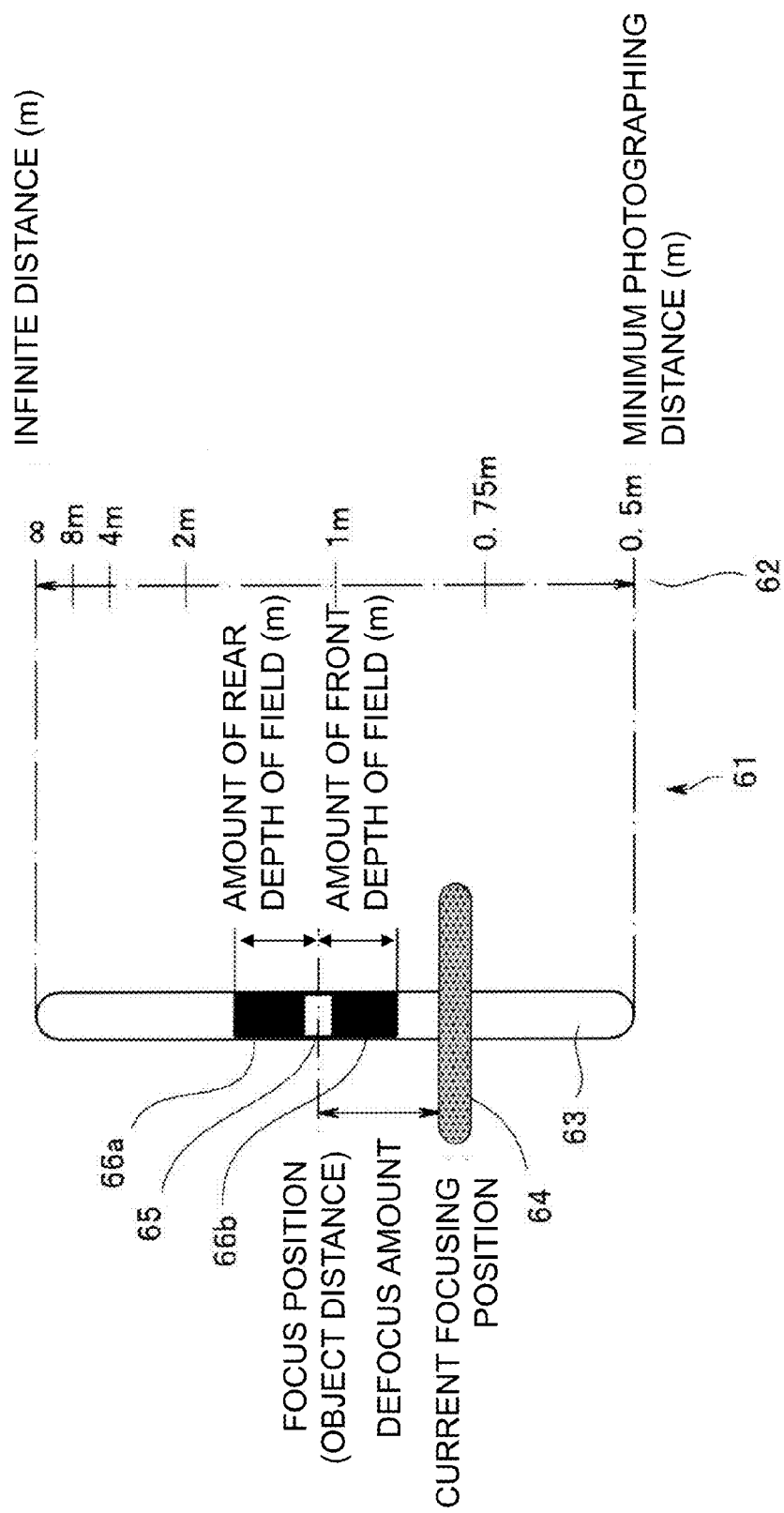

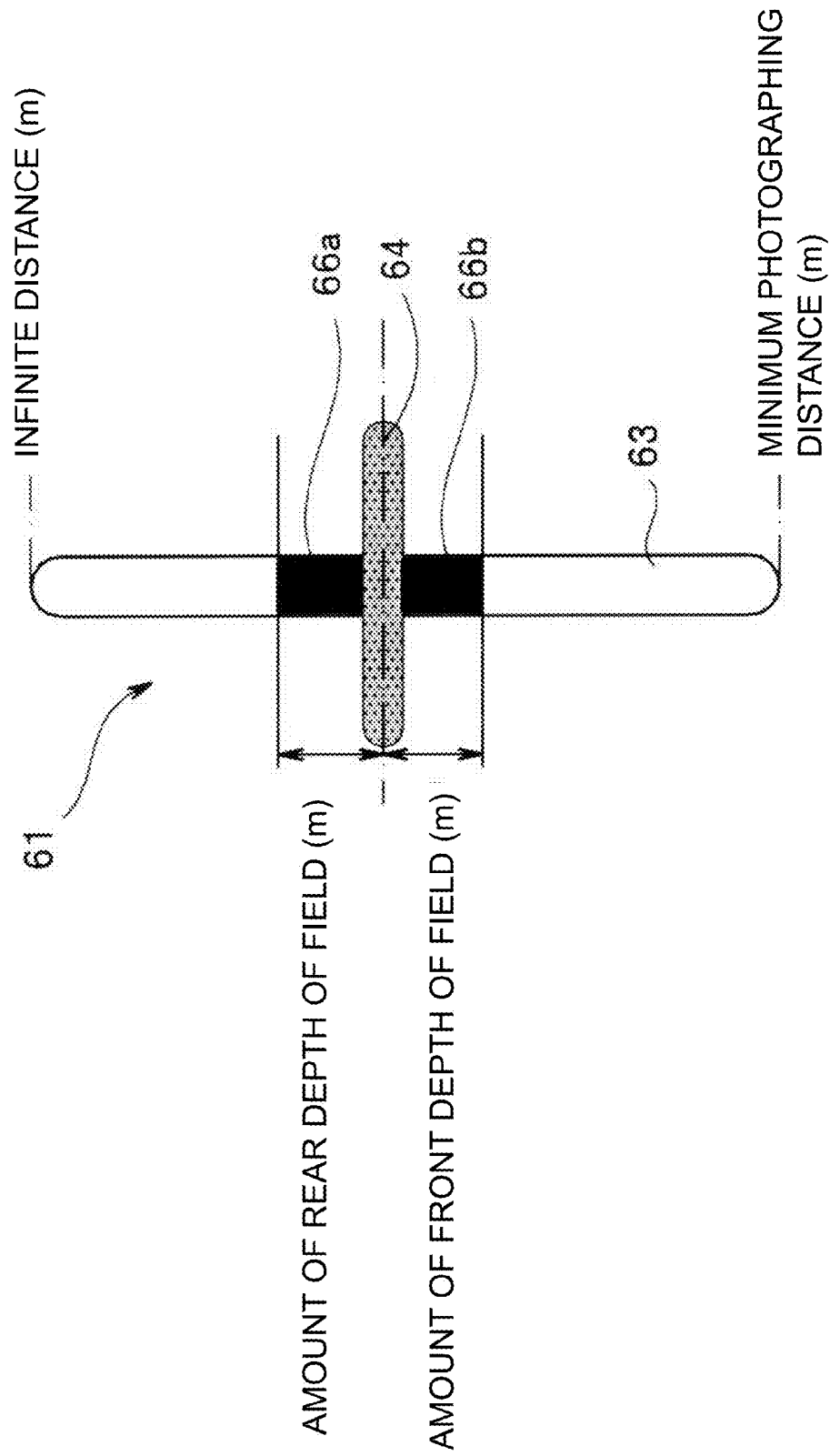

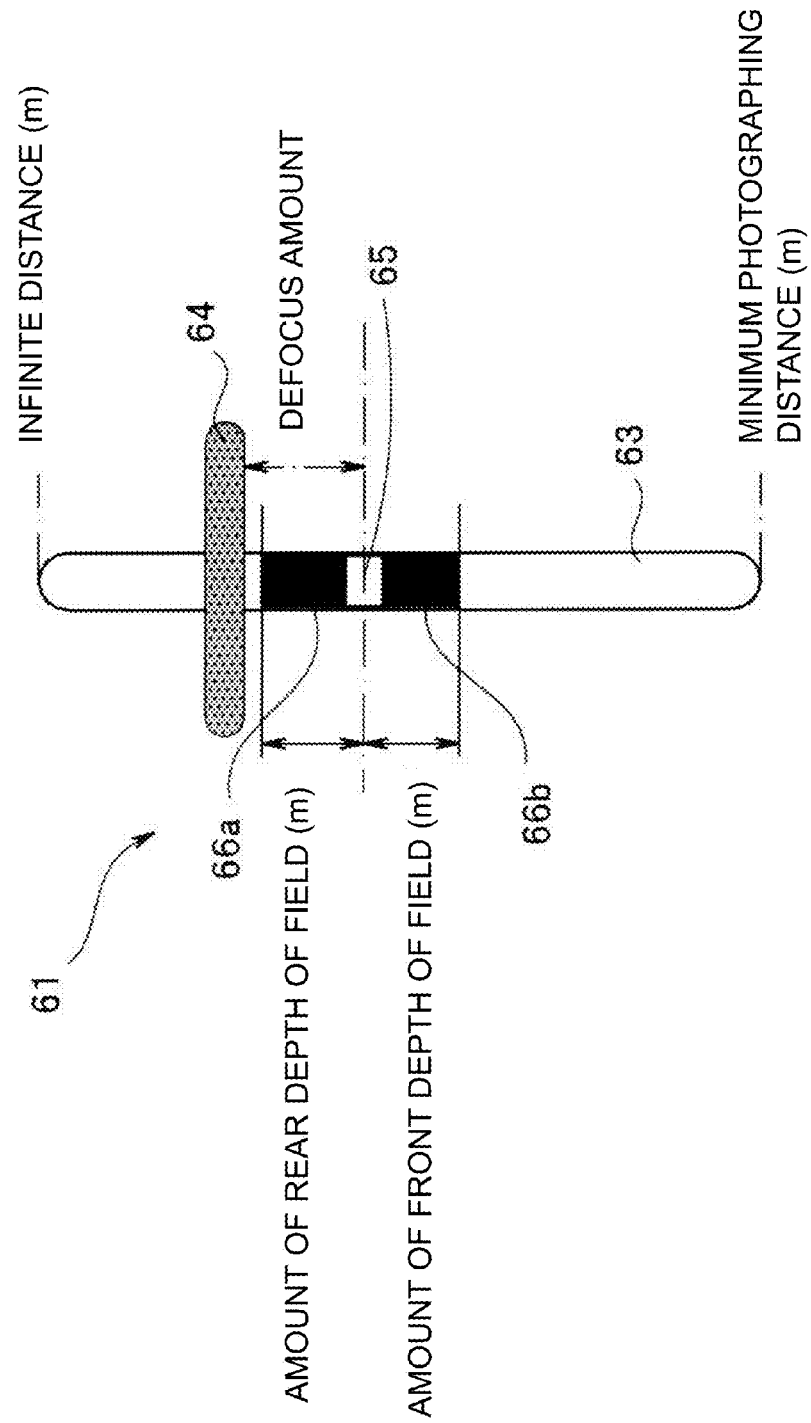

FIG.20
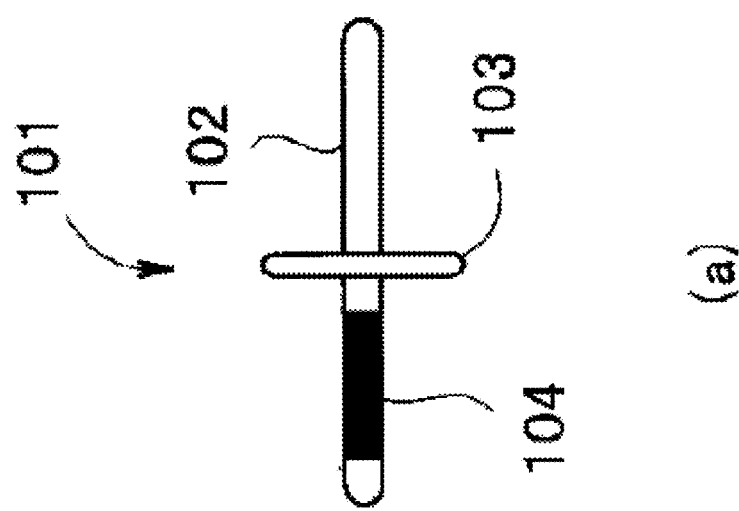
(b)
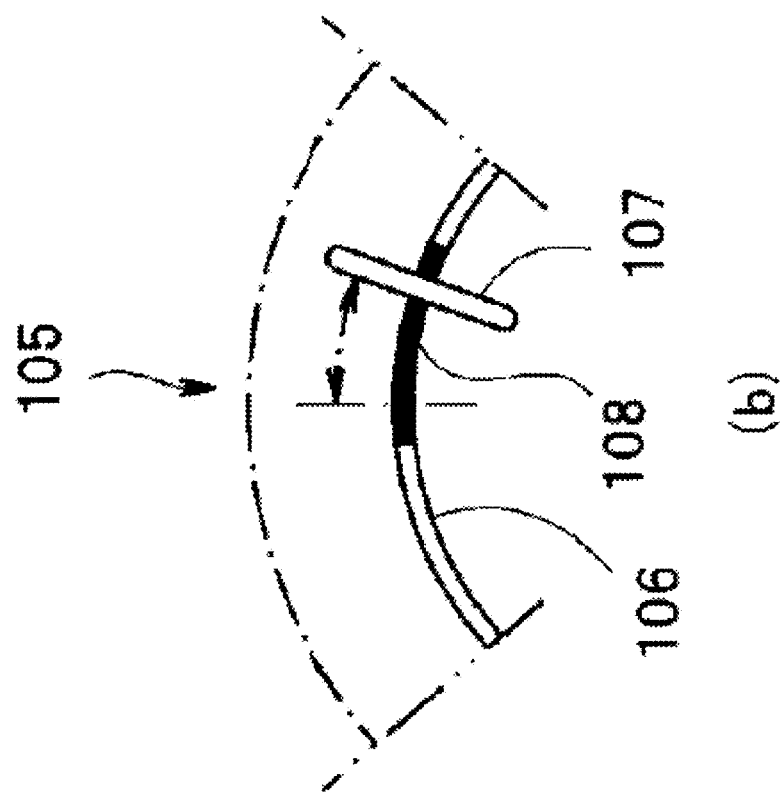
(a)

DISPLAY APPARATUS

CROSS REFERENCE TO RELATED APPLICATION

This application is based upon, and claims the benefit of priority from, the prior Japanese Patent Application No. 2013-054253, filed Mar. 15, 2013, the entire contents of which are incorporated herein by reference.

BACKGROUND OF THE INVENTION

1. Field of the Invention

The present invention relates to a display apparatus suitable for a photographing apparatus. More specifically, the present invention concerns providing a display method and apparatus which help a user to perform manual focusing on an object and/or manual aperture setting or adjusting.

2. Description of the Related Art

Recently, portable devices with photographing functions and display apparatus, such as digital cameras, are in widespread use. Such a portable photographing device is provided with a display unit for displaying, among other things, photographed images. In some portable photographing devices, a menu screen is displayed on a display unit to help the user operate the photographing device. To further improve operability, some photographing devices include a touch panel on the display panel, and can be operated by a touch operation on the touch panel.

In some such a photographing devices, in addition to an auto focus function, a manual focus function is provided in order to allow the user to capture various picture (video) expressions. For example, a camera disclosed in Japanese Unexamined Patent Application Publication No. 2008-256826 can display an in-focus state of respective points on a screen in order to help the user perform manual focusing.

SUMMARY OF THE INVENTION

However, a user might not be always able to easily perform manual focusing and aperture operations only by the display supposed in Japanese Unexamined Patent Application Publication No. 2008-256826.

Example embodiments consistent with the present invention provide a display apparatus which helps a user manually focusing on an object and/or setting or adjusting an aperture to make manual focusing operations easier.

An example control method consistent with the present invention obtains information of a focusing range (based on stored information regarding a photographing lens), calculates a current focusing position, generates display data which indicates the focusing range and current focusing position and displays the display data in an image (e.g., a live view image) which is being captured.

According to the example embodiments consistent with the present invention, the manual focusing and aperture operations are effectively supported so that the user can more easily perform manual focusing operations and/or aperture operations.

BRIEF DESCRIPTION OF THE DRAWINGS

The present invention is best understood from the detailed description which follows, taken in conjunction with the accompanying drawings, in which:

FIG. 4 is an explanatory diagram showing a way to hold and operate a photographing apparatus 1 during photographing;

FIG. 5 is an explanatory diagram showing an example of a screen display in a state of FIG. 4;

FIG. 8 is a table for illustrating the focus aid display according to the second embodiment;

FIG. 9 is an explanatory diagram for illustrating the focus aid display according to the second embodiment;

FIG. 10 is an explanatory diagram for showing the focus aid display in an in-focus state.

FIG. 11 is an explanatory diagram for showing the focus aid display in defocusing at a far side;

FIGS. 20 (a) and (b) are explanatory diagrams for showing another modification.

DETAILED DESCRIPTION OF THE INVENTION

Example embodiments consistent with the present invention will be described in detail below with reference to the drawings.

First Embodiment

Figure 1:
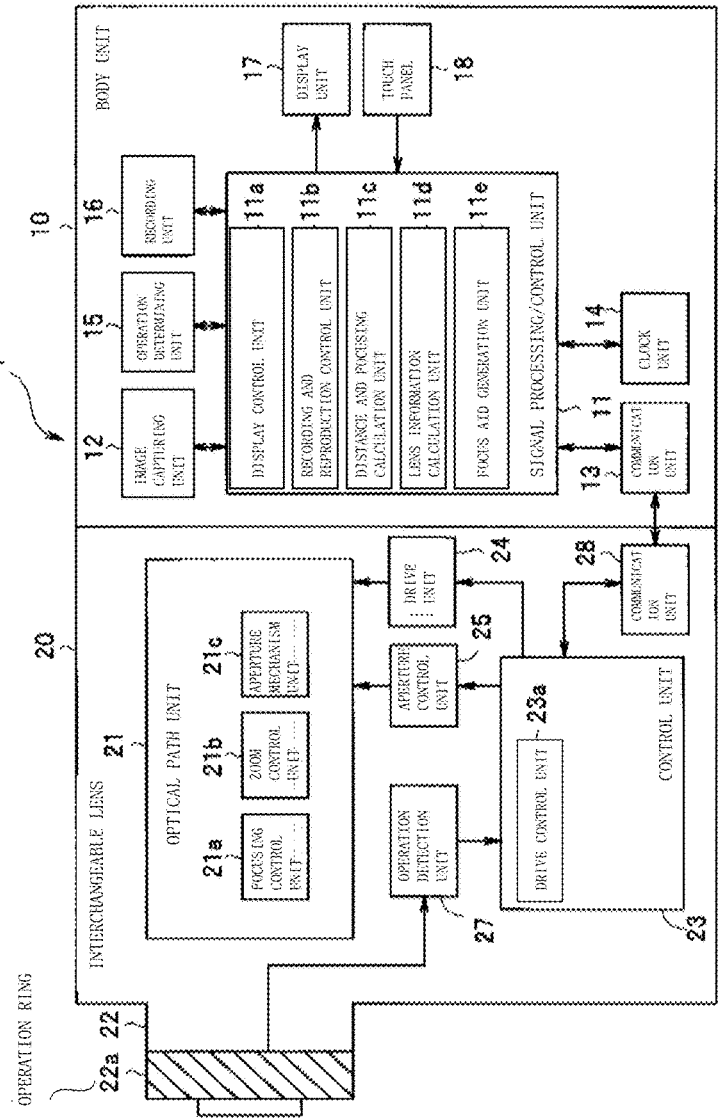
FIG. 1 is a block diagram showing a photographing apparatus provided with a display apparatus according to a first embodiment of the invention.

FIG. 1 is a block diagram showing an example photographing apparatus 1 provided with a display apparatus according to the first embodiment of the invention.

The example photographing apparatus 1 according to the first embodiment includes a body unit 10 and interchangeable lens 20. A principal circuit component of the photographing apparatus 1 is accommodated in the body unit 10. The interchangeable lens 20 is detachably attached on a front surface of the body unit 10.

The interchangeable lens 20 includes, in a lens barrel 22, an optical path unit 21 which guides an object image to an image capturing unit 12 of the body unit 10. The optical path unit 21 is provided with a lens or a lens system (not shown), aperture, and the like, for zooming and focusing. The optical path unit 21 includes a focusing control unit 21a, a zoom control unit 21b and an aperture mechanism unit 21c for driving the lens and the aperture. The focusing control unit 21a, zoom control unit 21b and aperture mechanism unit 21c are driven and controlled by a drive unit 24 and an aperture control unit 25.

The optical path unit 21 is configured such that a plurality of lenses is arranged (not shown) on an optical axis from an object side toward an image sensor surface of the image capturing unit 12. The optical path unit 21 includes a focus lens and a zoom lens (not shown). The focus lens is moved for setting an in-focus state by focusing on an object. The zoom lens is provided for changing the focus distance. The focusing control unit 21a and zoom control unit 21b are controlled by the drive unit 24 to control the focus lens and zoom lens, respectively. The aperture control unit 25 controls the aperture mechanism unit 21c which, in turn, controls the aperture (not shown). The aperture is arranged between any lenses in the optical path unit 21, for example. Alternatively, the aperture can be arranged after all of the lenses.

The lens barrel 22 is provided with at least one operation ring 22a, which is used for setting a photography parameter, such as zoom and/or aperture, responsive to a user's manipulation of the operation ring 22a.

An operation detection unit 27 detects a user's manipulation of the operation ring 22a and outputs a corresponding detection signal to a control unit 23. The control unit 23 is configured by a microcomputer or the like, and controls various units of the interchangeable lens 20 based on the detected signal(s) output by the operation detection unit 27 and a signal or signals from the signal processing/control unit 11 (described later). A drive control unit 23a of the control unit 23 generates various control signals, according to the detected signal(s) output by the operation detection unit 27 and a control signal or signals output from the signal processing/control unit 11. The drive control unit 23a generates a focus signal and zoom signal to control the drive unit 24, for example. Further, the drive control unit 23a generates an aperture control signal to control the aperture control unit 25.

The drive unit 24 drives and controls the focusing control unit 21a based on the focus signal and controls the zoom control unit 21b based on the zoom signal. The aperture control unit 25 drives and controls the aperture mechanism unit 21c based on the aperture control signal. The control unit 23 controls the drive unit 24 and the aperture control unit 25 so that a focusing position, zoom position and aperture state can be controlled responsive to control of the signal processing/control unit 11, for example.

The interchangeable lens 20 is provided with a communication unit 28. The body unit 10 is similarly provided with a communication unit 13. The communication unit 28 sends and receives information to and from the communication unit 13 via a transmission path. Any type of transmission path may be used. When communication between the body unit 10 and communication unit 13 is established, the control unit 23 can send lens information, such as lens-specific information, zoom operation information, focusing position and aperture state stored in a recording unit (not shown), to the body unit 10, via the communication units 28 and 13.

The lens information includes a table of a current focal distance, f-number and the like. Further, the lens information may include a table of a minimum photographing distance and infinite distance and the like, appropriate to respective zoom states. With the lens information, the body unit 10 recognizes zoom functions, a range of the focal distance, focal distance, minimum photographing distance, infinite photographing distance, f-number and the like of the interchangeable lens 20. The control unit 23 sends the detected signal(s) output from the operation detection unit 27 to the body unit 10.

The body unit 10 included in the photographing apparatus 1 is provided the image capturing unit 12, which is composed of an image sensor using a CCD or a CMOS, for example. The image capturing unit 12 performs photoelectric conversion of the object image from the interchangeable lens 20 provided on the front surface of the body unit 10 and obtains a captured image. The image capturing unit 12 is driven and controlled by the signal processing/control unit 11 to output signals corresponding to the captured image. The image sensor of the image capturing unit 12 may be provided pixels for focus detection (hereinafter referred to as "AF pixels"), in addition to imaging pixels (hereafter referred to as "normal pixels") for forming an image.

The signal processing/control unit 11, which includes a CPU or the like, controls respective units of the photographing apparatus 1. The signal processing/control unit 11 outputs a drive signal(s) for the image sensor to the image capturing unit 12, and reads the captured image information from the image capturing unit 12. The signal processing and control unit 11 performs predetermined signal processes, such as color adjustment, matrix conversion processing, noise removal, and various other digital processes on the read-out captured image data (which had been converted to digital data from analog signals by an analog-to-digital converter (ADC, not shown)). The signal from the image capturing unit 12 includes pixel signals from the AF pixels. The signal processing/control unit 11 performs focus control calculations using the signal from the AF pixels (described later).

A clock unit 14 and an operation determining unit 15 are also included in the body 10. The clock unit 14 generates time information to be used by the signal processing and control unit 11. The operation determining unit 15 is configured to generate an operation signal based on, and responsive to, a user's manipulation of the operation unit (not shown) provided on the body 10. The operation unit may include, for example, a release button, one or more function buttons and various switches, dials, rings, and the like. The operation signals may include signals for photographing mode setting, photographing parameter setting, shutter release, etc. The generated operation signal(s) is provided to the signal processing and control unit 11. The signal processing and control portion 11 controls respective units based on the operation signal(s).

A recording and play back control unit 11b of the signal processing/control unit 11 performs processing for recording and reproducing the captured image. For example, the recording and reproduction control unit 11b can compress the captured image information, after signal processing, and then provide the compressed image to a recording unit 16 to record therein. The recording unit 16 may include, for example, a removable memory card, or some other non-transitory recording medium, that, can record image information, sound information, and the like.

A display control unit 11a of the signal processing/control unit 11 executes various kinds of display processing. The display control unit 11a can provide the signal-processed captured image information to a display unit 17. The display unit 17 has a display screen using an LCD, or the like, and displays the image information provided from the display control unit 11a. The display control unit 11a is configured to provide information for displaying various menus and the like on the display screen.

The recording and reproduction control unit 11b can read out the (previously compressed) captured image information recorded in the recording unit 16 and execute expansion processing on the captured image information. The display control unit 11a provides the expanded captured image information to the display unit 17 so that the recorded captured image can be displayed.

The display unit 17 is provided with a display screen 17a for displaying the captured image (See FIG. 4.), as will be described later. A touch panel 18 is overlaid on the display screen 17a. The touch panel 18 can generate an operation signal corresponding to one or more positions on the display screen 17a touched by a user's finger. The operation signal is provided to the signal processing/control unit 11. When the user touches, slides their finger on, or performs a multi-touch gesture (such as pinch-in, pinch-out, etc.) on the touch panel 18 overlaying the display screen 17a, the signal processing/control unit 11 can receive signals based on detected time, position(s), direction(s), velocity(ies), etc. of the touch(es) so as to execute processing corresponding to the user's operation.

The display unit 17 may be disposed so as to occupy almost a whole area of a rear surface of the body unit 10, for example. (See FIG. 4.) A photographer can check a live view image displayed in the display screen 17a of the display unit 17 during photographing and also perform a photographing operation while checking the live view image.

According to one example embodiment, the signal processing/control unit 11 is provided with a distance and focusing calculation unit 11c. The distance and focusing calculation unit 11c can perform focus control using the pixel signal(s) from the AF pixel(s).

Figure 2:
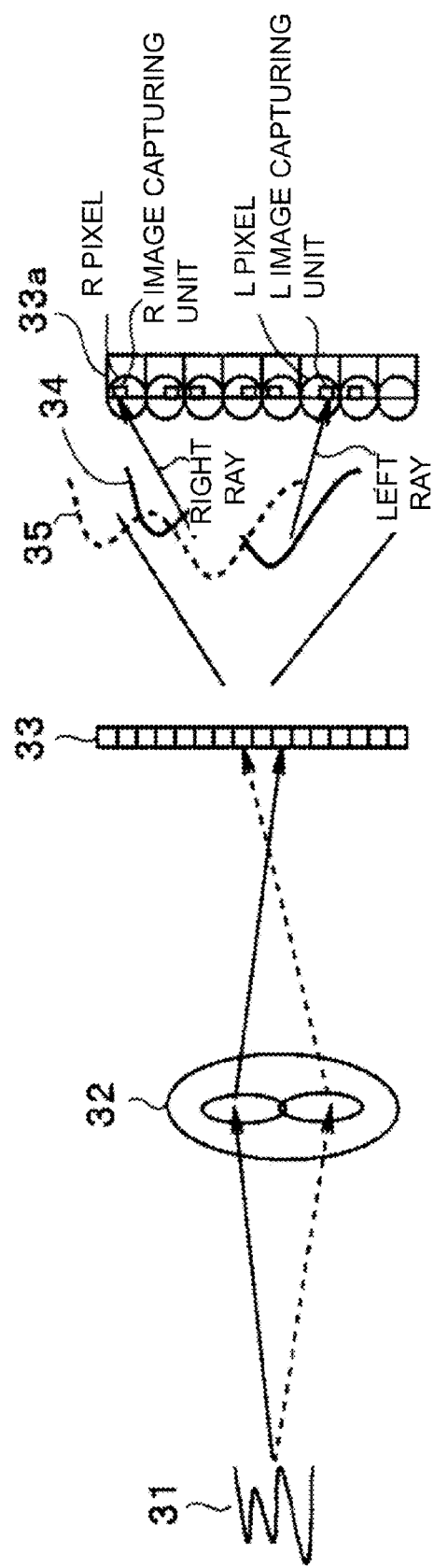
FIG. 2 is an explanatory diagram illustrating focus control by a phase difference detection method.

FIG. 2 is an explanatory diagram illustrating focus control by a phase difference detection method.

According to the phase difference detection method, an optical path from the object is divided to right and left directions. That is, an exit pupil is split into right and left. A luminous flux passing through the right pupil (right ray) and a luminous flux passing through the left pupil (left ray) are incident on the image sensor surface of the image sensor (a plane of incidence). The image sensor is configured by a pixel(s) (or a pixel group) for receiving the right ray (hereinafter referred to as "R pixel") and another pixel(s) (or pixel group) for receiving the left ray (hereinafter referred to as "L pixel"). The right ray and the left ray are formed on respective image sensor surfaces of the R pixel and L pixel, respectively.

In FIG. 2, an optical image entering the photographing apparatus via respective optical paths from an object 31 is formed on an incident surface of an image sensor 33 included in the image capturing unit 12, by a photographing lens 32 included in the optical path unit 21 of the interchangeable lens 20. The AF pixel(s) for the AF detection include an R image capturing unit and L image capturing unit. Respective optical paths are divided to right and left directions. The luminous flux passing through the right pupil (right ray) and the luminous flux passing through the left pupil (left ray) are incident into the R image capturing unit and L image capturing unit, respectively. A part 33a of the image sensor 33 is magnified and shown in the right side of FIG. 2. The right ray and left ray are incident onto the R image capturing unit and L image capturing unit, respectively because the R and L image capturing units are offset from the optical axis of the photographing lens 32.

When the object is in focus, corresponding pixels of the R and L image capturing units receive rays from substantially the same point on the object. Therefore an image signal obtained by a plurality of pixels of the R image capturing unit and an image signal obtained by a plurality of pixels of the L image capturing unit arranged in the horizontal direction for AF detection are identical. As shown in FIG. 2, when the object is out of focus, the rays from the same point on the object are incident into the R and L image capturing units are displaced by an amount corresponding to a focus deviation (also referred to as "defocus") amount. Therefore, an image signal 34 obtained by the plurality of the R image capturing units (a continuous line) and an image signal 35 obtained by the plurality of the L image capturing units (a dashed line) for AF detection arranged in the horizontal direction are shifted in terms of phase, and an amount of phase shift corresponds to the focus deviation amount.

Referring back to FIG. 1, the distance and focusing calculation unit 11c obtains a difference on the image sensor surfaces between the image signals 34 and 35 obtained by the R and L image capturing units (that is, an interval between the two images), and then calculates a defocus amount and a defocus direction using the interval between the two images and any other parameters used to calculate a defocus amount. The distance and focusing calculation unit 11c determines a current focusing position and object position (object distance) based on the calculated defocus amount, and then drives a lens for adjusting focusing depending on the defocus amount to perform auto focus. The distance and focusing calculation unit 11c can obtain any needed calculation parameters from the stored lens information.

The distance and focusing calculation unit 11c calculates the defocus amount and object position according to the phase difference detection method, as described above. However, in an alternative embodiment, the object position may be obtained according to a contrast detection method to obtain the current focusing position and defocus amount when the image capturing unit 12 does not include the AF pixels.

A lens information calculation unit 11d obtains the lens information and information regarding the image capturing unit 12 from the control unit 23 of the interchangeable lens 20. The lens information calculation unit 11d refers to the lens information concerning a minimum photographing distance and an infinite photographing distance. Additionally, the lens information calculation unit 11d obtains an amount of a rear depth of field and an amount of front depth of field based on the lens information and information regarding the image capturing unit 12. Such information regarding the image capturing unit 12 is typically fixed, depending on the type (e.g., model number) of image capturing unit.

A focus aid generation unit 11e generates information necessary for displaying a focus aid 55 (described in more detail below) based on information provided from the distance and focusing calculation unit 11c and the lens information calculation unit 11d. The focus aid generation unit 11e then outputs the focus aid display information, which is provided to the display control unit 11a. The focus aid 55 information is used to generate a display which helps a photographer perform manual focus operations easily. For example, the focus aid display may include information indicating to the photographer the minimum photographing distance, infinite photographing distance, current focusing position, object position, rear depth of field, front depth of field, and the like. In some example embodiments consistent with the present invention, the above-described information is displayed on a line between the shortest photographing distance and the infinite distance. In the focus aid 55 display, respective information may be displayed on a bar extending from a first end point, corresponding to the minimum photographing distance, to a second end point, corresponding to the infinite photographing distance.

The display control unit 11a is configured to receive the information generated by the focus aid generation unit 11e for displaying the focus aid display, and then display the focus aid display overlaid on the live view image.

Figure 3:
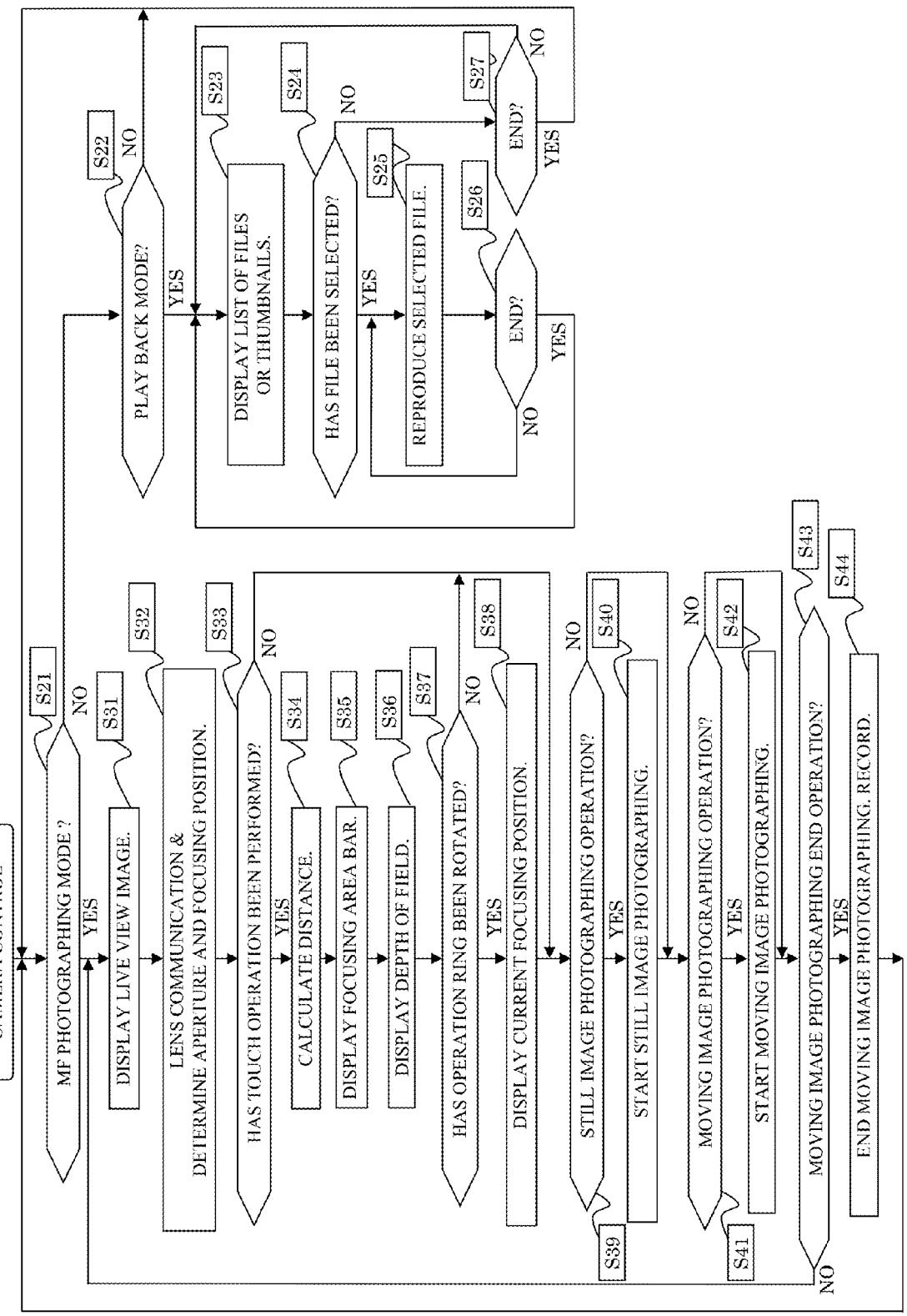
FIG. 3 is a flowchart for illustrating s camera control process.

Next, operations of the embodiment configured as described above will be described with reference to FIGS. 3 to 5. FIG. 3 is a flowchart for illustrating control of the photographing apparatus 1. FIG. 4 is an explanatory diagram showing a way to hold and operate the photographing apparatus 1 during photographing. FIG. 5 is an explanatory diagram showing an example of a screen display, including a focus aid display, in the state of FIG. 4.

When the photographing apparatus 1 is powered on, the signal processing/control unit 11 determines at step S21 in FIG. 3 whether or not an MF (manual focus) photographing mode is set. If the MF photographing mode has not been indicated, the signal processing/control unit 11 determines at step S22 whether or not a play back mode has been indicated. If the play back mode has been indicated, the signal processing/control unit 11 displays a list of files or a set of thumbnails at step S23. The user can view the list of files or set of thumbnails. If the user then selects an image, the process proceeds from step S24 to step S25, and the signal processing/control unit 11 plays back the selected image. When the play back ends (YES branch of step S26), the thumbnail listing is repeated. If not (NO branch of step S26), the selected file continues to be reproduced. When no image is selected (NO branch of step S24), the signal processing/control unit 11 determines at step S27 whether or not the play back mode is ended. If so, the camera control process returns to step S21. If not, the process branches back to step S23.

Meanwhile, referring back to step S21, if the MF photographing mode has been indicated, the signal processing/control unit 11 causes the display unit 17 to display a captured image (e.g., in a series of live view images) at step S31, based on image signals from the image capturing unit 12.

As shown in FIG. 4, a photographer 41 supports the lens barrel 22 of the interchangeable lens 20 with a left hand 42L and holds the body unit 10 for photographing. As shown in FIG. 4, the display screen 17a of the display unit 17 is provided on the rear surface of the body unit 10. FIG. 4 shows an example for photographing a plant 47 with flowers 45 and 46 as an object to be captured. A live view image 51 is displayed in the display screen 17a of the display unit 17 provided on the body unit 10 as shown in FIG. 5. Images 52 and 53 corresponding to the flowers 45 and 46, respectively, are captured in the live view image 51.

Referring back to FIG. 3, at step S32, while the display of the live view image continues, the signal processing/control unit 11 of the body unit 10 performs communication with the control unit 23 of the interchangeable lens 20, obtains the lens information and operation information, and determines the aperture and focusing position.

Subsequently, the signal processing/control unit 11 determines at step S33 whether or not a touch operation has been performed on the touch panel 18. If it is determined that the touch operation has not been performed, a still image photographing operation, moving image photographing operation or a moving image photographing end operation may be performed at steps S39, S40, S41, S42, S43 and S44. Details of these steps are described later.

The focus aid 55, which helps the photographer 41 to easily perform a manual focus operation, is displayed. The photographer 41 touches a position within the displayed image on which focusing is targeted in the live view image 51 displayed in the display screen 17a with an index finger 42a of their right hand 42R. Alternatively, the object on which to target focusing may be determined automatically.

Referring back to step S33, if it is determined that the touch operation is detected by the touch panel 18, this determination is sent to the signal processing/control unit 11. The distance and focusing calculation unit 11c obtains a distance to the designated object (step S34). The lens information calculation unit 11d obtains the information of the minimum photographing distance and infinite photographing distance from the lens information.

The focus aid generation unit 11e generates display signals for a focusing area bar 56, which makes up the main part of the displayed focus aid 55, based on the signals from the distance and focusing calculation unit 11c and lens information calculation unit 11d and then outputs the display signal to the display control unit 11a. Thus a focusing area bar 56, which makes up the main part of the focus aid display 55, is displayed by the display control unit 11a in the live view image 51 displayed in the display screen 17a (step S35).

The focusing area bar display 56 corresponds to an in-focus range. More specifically, a lower end 56a of the bar 56 corresponds to the shortest photographing distance and an upper end 56b of the bar 56 corresponds to the infinite distance. The display control unit 11a causes the focus aid generation unit 11e to display an object position display 57a which indicates an object position, on the focusing area bar display 56. Note that the object may be an object corresponding to the position of the live view image touched by the photographer. Additionally, at step S36, the display control unit 11a causes the focus aid generation unit 11e to display a rear depth of field display 57b, which indicates a range of the rear depth of field, and a front depth of field display 57c, which indicates a range of the front depth of field, on the focusing area bar display 56.

At step S37, the signal processing/control unit 11 determines whether or not a focusing operation has been performed. For example, a rotation operation of the operation ring 22a by the photographer is detected. When the photographer 41 rotates the operation ring 22a to set focusing, the rotation operation is detected by the operation detection unit 27 and then the control unit 23 of the interchangeable lens 20 outputs an operation signal corresponding to a rotation amount, which is provided to the signal processing/control unit 11 of the body unit 10. The display control unit 11a causes the focus aid generation unit 11e to display a focusing position display 57d which indicates the current focusing position, on the focusing area bar display 56 based on the output of the distance and focusing calculation unit 11c (step S38). Therefore, the focusing position display 57d will move up or down the bar responsive to the photographer's 41 manipulation of the operation ring 22a. This allows the photographer 41 to intuitively understand whether or not the focus position (indicated by 57d) is becoming closer to, or farther from, the object position (indicated by 57a), as well as whether or not the focus position is within the rear or front depth of field (indicated by 57b and 57c, respectively).

As described above, FIG. 3 shows as an example control method in which the focusing position display 57d is displayed after the operation of the operation ring 22a is detected. However, the focusing position display 57*d* may be displayed before (and while, and after) the operation ring 22*a* is operated. In addition, referring back to steps S33-S38, although FIG. 3 indicates that the steps S34-S38 are only performed if the touch operation has been performed (YES branch of step S33), in some example embodiments consistent with the present invention, steps S34-S38 may be performed without this condition being met. For example, instead of the photographer touching the touch display to select an object of interest to be focused on, one or more objects of interest may be selected automatically.

Due to the focus aid display 55, the photographer 41 can recognize a moving direction and quantity of focusing when they perform a focusing operation, and accurate focus adjustment is easily achieved in the case of manual focus. Although determination of whether an in-focus state has been obtained may be difficult in some live view images, displaying the focus aid 55 allows the photographer to easily recognize focus deviation and how to focus on the object intended as the main subject.

The above example describes that the signal processing/control unit 11 adjusts the focus by operating the operation ring 22*a*. However, the focus adjustment may be performed by a GUI (graphical user interface) operation to the focusing position display 57*d*. That is, the photographer may perform manual focus by moving the focus position 57*d* (for example, via a touch or swipe operation on the touch panel 18 overlaying the display unit 17.

At step S39, whether or not a still image photographing operation has been performed is determined. When a still image photographing operation is set by, for example, an operation of a release button by the photographer, the signal processing/control unit 11 performs photographing at step S40. That is, the signal processing/control unit 11 performs a signal process on the captured image information from the image capturing unit 12, and compresses the captured (and processed) image. After that, the image is sent to the recording unit 16 and recorded therein. At step S41, the signal processing/control unit 11 determines whether or not a recording a movie operation has been performed. When a moving image photographing operation is performed, the signal processing/control unit 11 starts the moving image photographing (step S42). When a moving image photographing end operation is performed (step S43), the signal processing/control unit 11 ends the moving image photographing and makes a file of a record image in the recording unit 16 (step S44).

In FIG. 5, an actual distance (e.g., as a numerical value in some unit of length) is not displayed. However, distance information (such as the minimum photographing distance, infinite photographing distance, current focusing position and rear and front depth of field for example) may be displayed.

For example, when the lens 20 is changed, the minimum photographing distance and infinite distance will often differ from those values of the previously used lens, depending on lens characteristics. In some example embodiments, these distances may be normalized and the focusing area bar display 56 may be always displayed in a constant size. Normalizing and displaying the focusing area bar display 56 in a constant size enables the manual focus operation with a same feeling all the time even when a different lens is attached. In some example embodiments, the focusing area bar display 56 is always displayed at the same relative position of the live view image.

FIG. 5 shows an example in which only a single focus aid display 55 is displayed. However, if more than one objective are to be captured, each may have its own single focus aid display 55. That is, when there are more than one subject in a given image (for example, the two separate flowers), there can be a focus aid display for each. In this case, normalizing the sizes of each focus aid display 55 in the focusing area bar display 56 would be helpful. For example, three focusing area bar displays 56 may be displayed at three areas (for example, at the upper one-third, middle one-third and lower one-third parts of a vertical length) of the screen.

According to the first embodiment, the focus aid display 55 including the bar display shows the minimum photographing distance, infinite photographing distance, object position, current focusing position, rear and front depth of field and the like so that the photographer can easily recognize the focus position, state of depth of field and the like. As a result, the manual focus operation can be remarkably simplified. As described above, the first embodiment can effectively help the photographer focusing on a main object (and perhaps operating an aperture) by simplifying the manual focus operation.

Second Embodiment

FIGS. 6(*a*) and (*b*) collectively depict a flowchart for showing the second embodiment of the present invention. The hardware arrangement of the second embodiment is similar to that of the first embodiment. The first embodiment describes an example in which a single focus aid display is displayed. The second embodiment will describe another example in which a plurality of focal aid displays for a plurality of objects can be displayed simultaneously.

First, the focal aid display according to the second embodiment will be described in detail with reference to the flowchart of FIG. 7, table of FIG. 8 and explanatory diagram of FIG. 9. The display data for the focus aid display is generated by the distance and focusing calculation unit 11*c*, lens information calculation unit 11*d* and focus aid generation unit 11*e*, as in the first embodiment.

Figure 7:
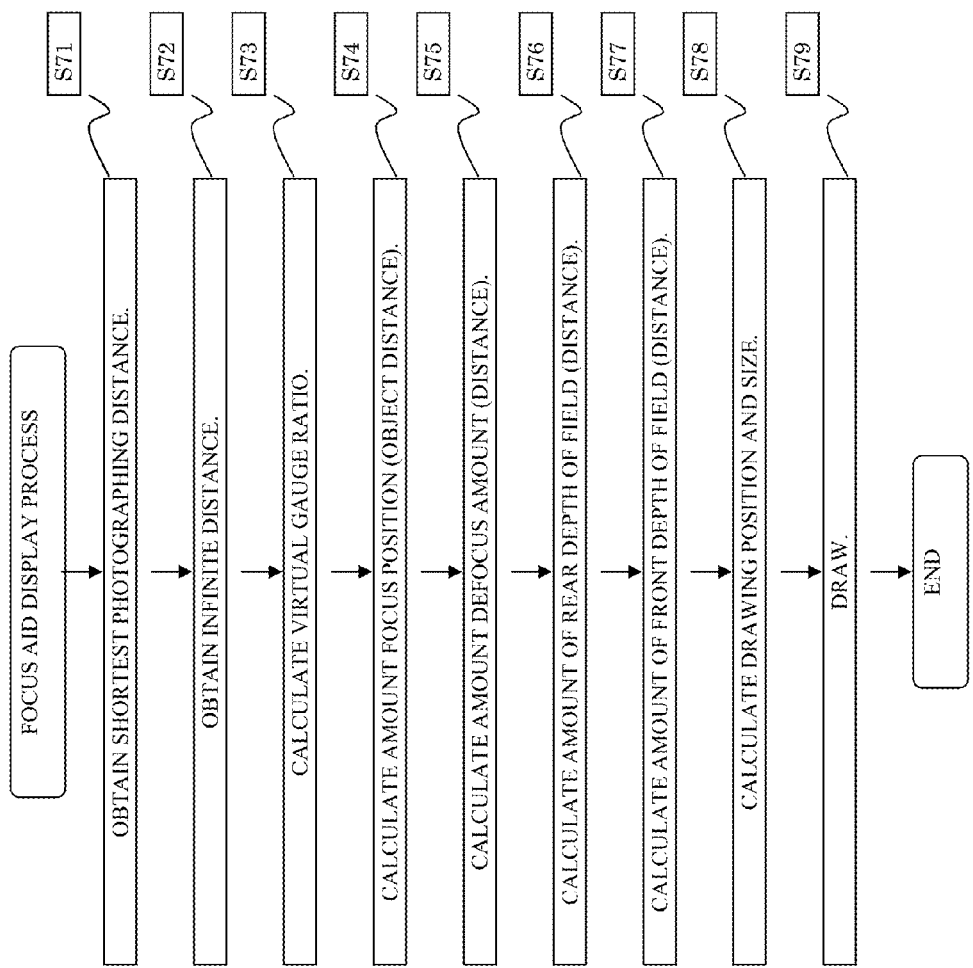
FIG. 7 is a flowchart for illustrating a focus aid display process according to the second embodiment.

At step S71 in FIG. 7, the lens information calculation unit 11*d* obtains the minimum photographing distance by referring to the table included in the lens information. At step S72, the lens information calculation unit 11*d* obtains the infinite photographing distance by referring to the table included in the lens information. Alternatively, the lens information calculation unit 11*d* may set a distance as a function of the focal length (for example, more than 2,000 times of the focal length) as an infinite photographing distance. At step S73, the focus aid generation unit 11*e* sets a virtual gauge having a scale defined by an inverse of a distance between the minimum photographing distance and the infinite photographing distance. As will be described below with reference to FIG. 9, this virtual gauge is used to scale the focus aid display. Subsequently, the distance and focusing calculation unit 11*c* calculates the object distance (that is, the distance to an automatically or manually selected main subject or target object) at step S74 and then calculates the defocus amount at step S75. Since the distance and focusing calculation unit 11*c* can calculate a focus position (object distance) by the AF pixel signal(s), for example, a difference between the focus position and current focusing position can be obtained as the defocus amount.

Subsequently, the lens information calculation unit 11*d* calculates amounts of the rear and front depth of field at steps S76 and S77, respectively. For example, the lens information calculation unit 11*d* can calculate the amounts of the front and rear depth of field based on the following optical configuration information.

Lens focal distance [mm]
Object distance [mm]
Distance from a lens to an imaging plane [mm]
Hyper-focal distance [mm] (Near point distance when the object distance is infinity)
F-number (Aperture size at the time of photographing)
Depth of focus [mm]
Acceptable diameter of circle of confusion [mm]
Near point distance [mm]
Far point distance [mm]
Front depth of field [mm]
Rear depth of field [mm]
Diagonal length of the sensor [mm]

The above information is obtained by reading basic information when a lens is attached and by current state information, such as the F number, focal length and object distance, which are always monitored.

When the object distance is longer than the focal length (excepting macro photography), the lens information calculation unit 11d may calculate the amounts of the front and rear depth of field by the following approximate expressions (1) and (2).

$$\text{Front depth of field} = (2 \cdot R \cdot \delta \cdot F)/(2 \cdot f + R \cdot \delta \cdot F) \quad (1)$$

$$\text{Rear depth of field} = (2 \cdot R \cdot \delta \cdot F)/(2 \cdot f - R \cdot \delta \cdot F) \quad (2)$$

R: Object distance
F: F-number
f: Focal distance
δ: Acceptable diameter of circle of confusion The determination results shown in the table of FIG. 8 are obtained by a common approximate expression. FIG. 8 shows an example where an image plane width is 17.30 mm, an image height is 13.00 mm, a diagonal length is 21.64 mm, an acceptable diameter of circle of confusion is 0.01665 mm, a photographing lens is a standard type of 25.01 mm and an object distance is 5 m. The rear and front depth of field may be obtained in a manner that the table of FIG. 8 is recorded in a memory (not shown) in advance and the lens information calculation unit 11d reads the table from the memory.

At step S78, the focus aid generation unit 11e calculates a displaying position and size of the focus aid 55/61 to generate the display data for the focal aid display based on the values obtained at each step. This display data is sent to the display control unit 11a. Then the focus aid display 55/61 is displayed (e.g., drawn) in the display screen 17a (step S79).

FIG. 9 is an explanatory diagram for illustrating an example focus aid display 61. In FIG. 9, the focal aid display 61 includes a gauge display 62, focusing area display 63 having a lower end corresponding to the minimum photographing distance (0.5 m in this example) and an upper end corresponding to the distance infinity, current focusing position display 64 on the focusing area display 63 for displaying the current focusing position, rear and front depth of field displays 66a and 66b, respectively, displayed in black and focus position display 65 shown by a plain area between the depth of field displays 65a and 65b.

The gauge display 62 is marked with a scale of the inverse of the distance. That is, the gauge display 62 is a scale based on an inverse of distance. For example, the distance infinity has a virtual scale value of 0, the distance 8 m has a virtual scale value of ⅛, the distance of 4 m has a virtual scale value of ¼, the distance 2 m has a virtual scale value of ½, the distance 1 m has a virtual scale value of 1, the distance of 0.5 m (the minimum photographing distance) has a virtual scale value of 2, and so on. In this example, both the infinite distance and the minimum photographing distance are 1 unit away from the focus position (object distance) on the virtual scale 62. However, simply using the inverse of distance will not always result in the infinite and minimum distances being the same unit away from the focus position. Fortunately, it is mathematically possible to calculate a virtual scale such that the near point distance and far point distance are marked equidistant from the object distance on the virtual scale. For accurate individual lens adjustment, it is sometimes necessary for matching the gauge display 62 with the actual distance.

Alternatively, the gauge display 62 may be omitted as the focus aid display, and the minimum photographing distance and infinite photographing distance which change depending on an attached lens, zoom state of the lens and the like may be abstracted to display a relative amount. Such a focus aid display does not show the photographer the distance and so advanced setting for the display is not necessary. The photographer can instinctively perform the focus operation.

Next, the relationship between an in-focus state and the focus aid display will be described with reference to FIGS. 10 to 14.

FIG. 10 shows the focus aid display 61 in an in-focus state. As shown in FIG. 10, the focusing position display 64 is located on (over) the focus position display 65, between the rear depth of field display 66a and front depth of field display 66b.

Figure 12:
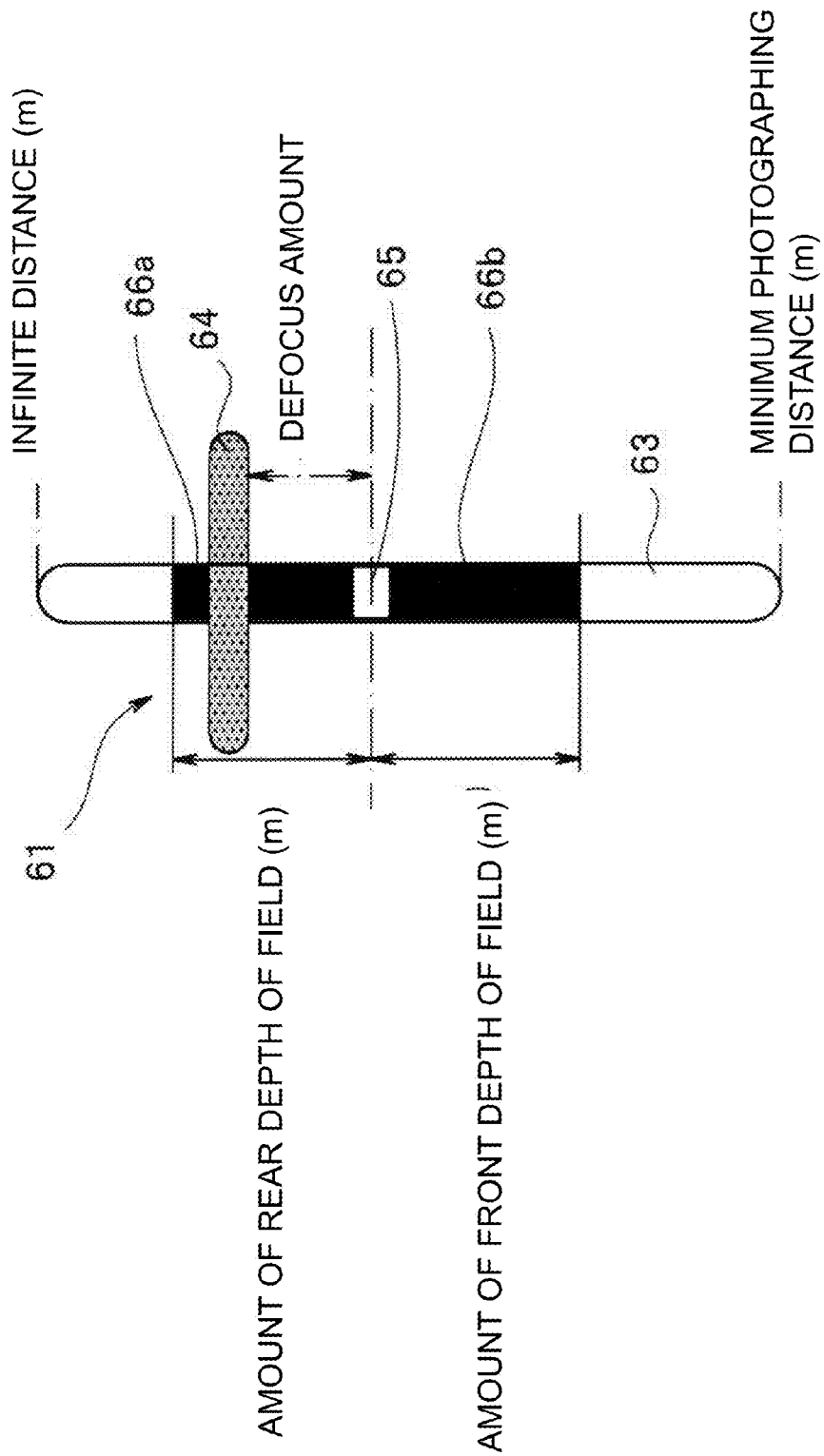
FIG. 12 is an explanatory diagram for showing the focus aid display in defocusing at a far side.

FIGS. 11 and 12 show examples of the focus aid display 61 in a state of defocusing at the far side. In FIGS. 11 and 12, a same object at a same object position is photographed and a defocus amount is also same, but the range of the front and rear depth of fields in FIG. 12 are larger than those in FIG. 11 (e.g., due to the photographer adjusting the aperture setting to make it smaller (larger f-stop)). In FIG. 11, the object is out of focus. The focusing position display 64 is located between the infinity side and the focus position display 65, and between the infinity side than and the rear depth of field display 66a. On the other hand, in FIG. 12, although the focusing position display 64 is still located between the infinity side and the focus position display 65, it is within a range of the display 66a of the rear depth of field display 66a. Since the defocus amount is within the range of the rear depth of field, the object is in-focus and can be photographed.

The photographer may adjust the focus so as to make the defocus amount "zero" (or within the smaller rear depth of field 66a) by referring to the display of FIG. 11 or by changing the amount of the depth of field (e.g., by adjusting the aperture) as shown in FIG. 12. If the photographer refers to the focus aid display 61, the photographer can relatively easily perform a manual focus on the target object by an instinctive operation. The lens information calculation unit 11d can easily recognize whether the amount of the depth of field can be adjusted so as to focus on the object in a current state of the defocus amount, based on the table of the depth of field according to aperture states, and so the display may show the photographer that focusing is possible by adjusting the aperture.

Figure 13:
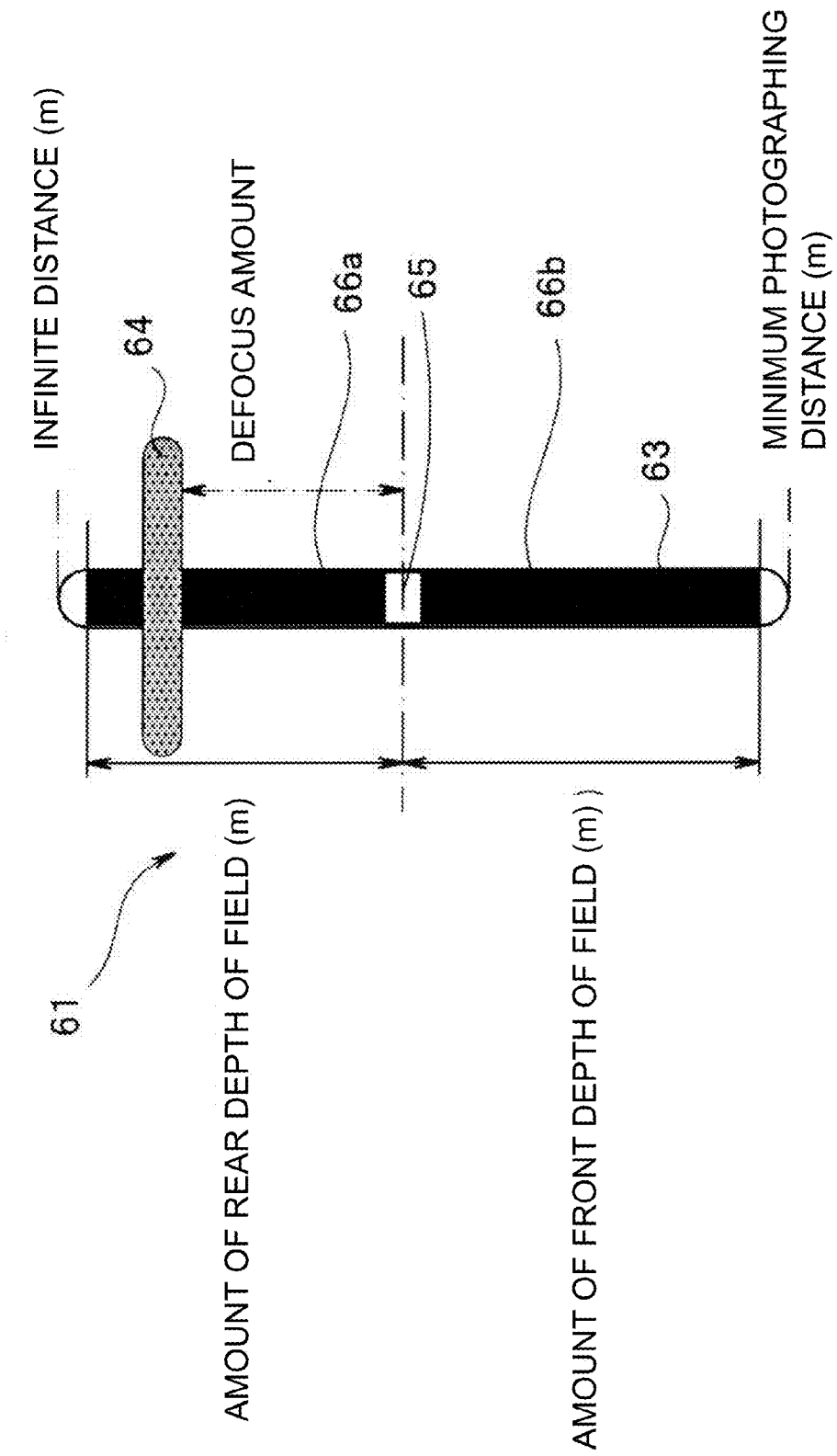
FIG. 13 is an explanatory diagram for showing the focus aid display in a deep-focus state.

FIG. 13 shows the focus aid display 61 in a deep-focus state. According to an example shown in FIG. 13, the depth of field is nearly identical to an image-taking enable area (that is, nearly the full area from the minimum photographing distance to the infinite photographing distance) due to, for example, stopping down the aperture. Consequently, the defocus amount is within the rear depth of field 66a. Accordingly, the target object is in-focus and can be photographed.

Figure 14:
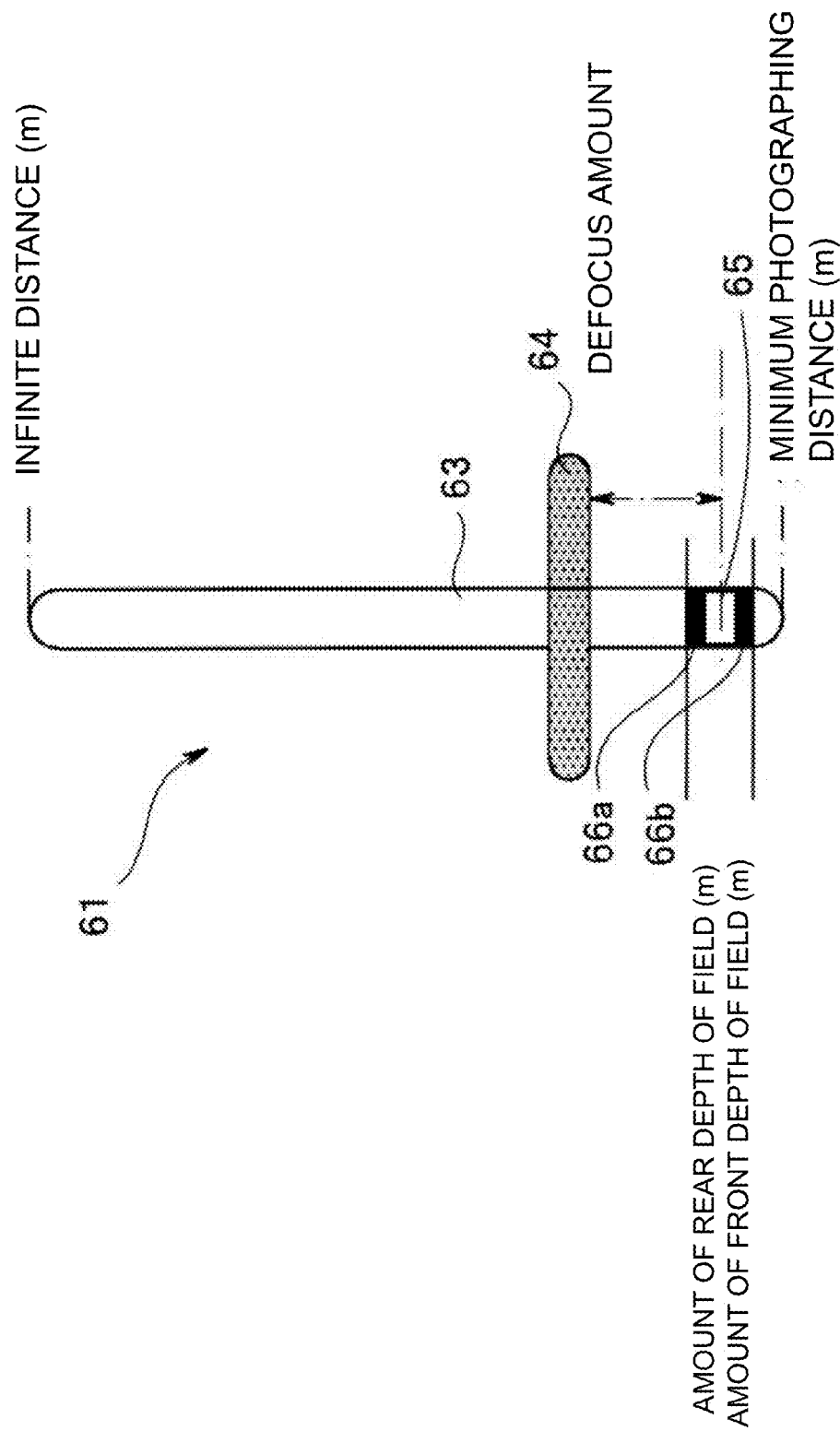
FIG. 14 is an explanatory diagram for showing the focus aid display when a depth of field is shallow.

FIG. 14 shows the focus aid display 61 when the depth of field is shallow (for example, due to a relatively large (low f-stop) aperture setting). An example of FIG. 14 corresponds to a case in which a lens having a longer focal length is used or photographing is performed in a full aperture state, for example. The depth of field is shallow and the object does not come into focus even though there is only a slight defocus.

If visibility of the depth of field is impaired under this circumstance (since it is such a small portion of the bar 63), it is possible to switch the display to another display in which the virtual gauge is automatically rescaled, and/or to zoom in on a targeted portion of the focus aid display (e.g., to zoom in at the focus position), and/or to omit some or all of the far side of the focus aid display (between the focusing position display 64 and the infinite distance). Still referring to FIG. 14, by rescaling the virtual gauge to 1/(N*distance), or $1/distance^N$ (where N is a non-zero whole number), the portion of the focus aid display for the larger distances will be reduced relative to the portion of the focus aid display for the smaller distances. Alternatively, or in addition, by removing the portion of the focus aid display between the focusing position display 64 and the infinite distance (as this portion does not convey very useful information to the photographer), the remaining (more useful) portions can be enlarged.

Figure 6A:
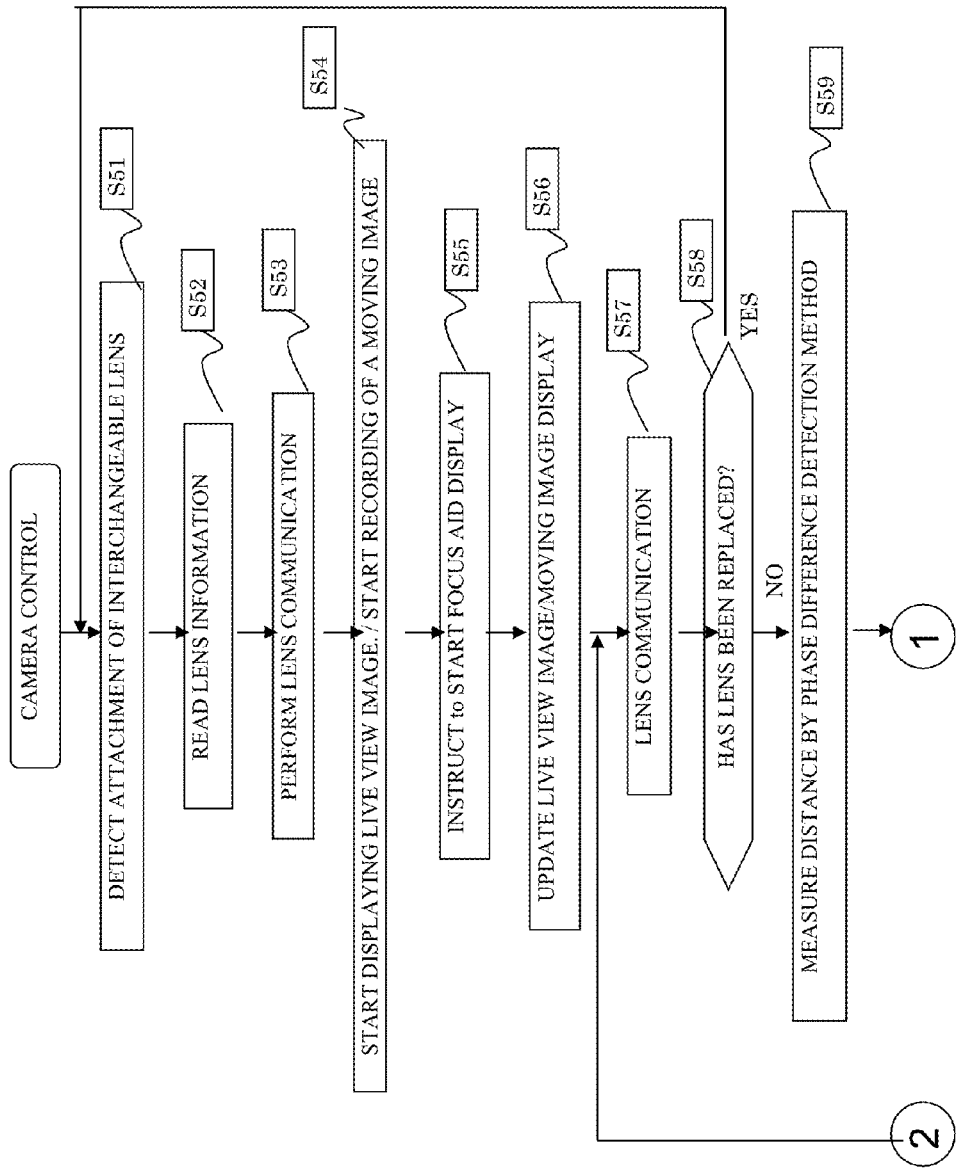
FIGS. 6(a) and (b) collectively depict a flowchart for illustrating a camera control process in a second embodiment of the invention.

Next, the operation for focusing will be described with reference to the flowchart of FIGS. 6(a) and (b) and explanatory diagrams of FIGS. 15(a)-(d) and 16(a)-(c).

When the photographing apparatus 1 is powered on, the signal processing/control unit 11 detects at step S51 in FIG. 6 that the interchangeable lens 20 is attached. At step S52, the signal processing/control unit 11 communicates with the control unit 23 of the interchangeable lens 20 to read the stored lens information (step S53). The lens information calculation unit 11d records the read lens information in a recording unit (not shown). Thus configuration information according to the zoom position and focus position is stored in the body unit 10.

At step S54, the signal processing/control unit 11 starts displaying a live view image. When recording of a moving image is set, moving image recording is started. According to the second example embodiment, at step S55, the signal processing/control unit 11 receives a start operation for the focus aid display. The photographer can set the focus aid display by, for example, manipulating an operation button for setting the focus aid display (not shown) or touching a menu display.

At step S56, the signal processing/control unit 11 updates the live view image or moving image display. At step S57, the signal processing/control unit 11 performs lens communication. At step S58, the signal processing/control unit 11 determines whether or not lens replacement has been performed. If the lens replacement has been performed, the process returns to step S51 and the signal processing/control unit 11 repeats the processes of steps S51 to S57. If the lens replacement has not been performed, the process proceeds to step S59 and a process for the focus aid display is performed.

That is, the distance and focusing calculation unit 11c distance to the target object is determined (e.g., by the phase difference detection method) at step S59. Thereby the distance and focusing calculation unit 11c can calculate the object distance, defocus amount and defocus direction at one or more (for example) predetermined distance measurement points. Therefore, the distance and focusing calculation unit 11c can calculate the object distance and defocus amount at all distance measurement points, for example. Additionally, the minimum photographing distance and infinite photographing distance are obtained from the lens information by the lens information calculation unit 11d.

In addition to, or alternatively to, the phase difference detection method, the distance and focusing calculation unit 11c can perform a focus processing, so-called a hill-climbing method by which contrast of a captured image is determined, or use a same method as an AF processing used for common single-lens reflex cameras in which a transmission mirror and phase difference sensor are used.

Figure 6B:
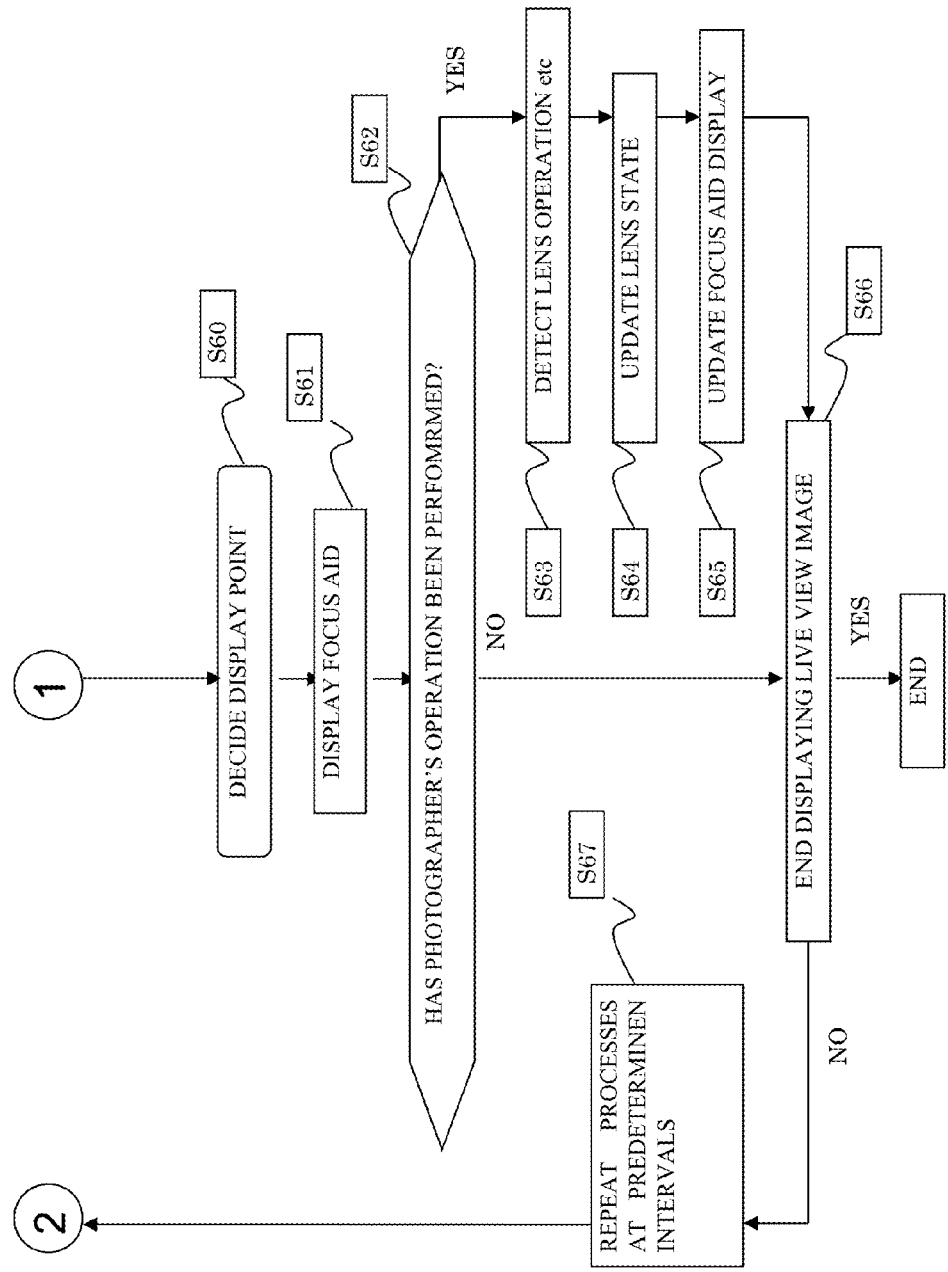

Referring now to FIG. 6(b), subsequently, the signal processing/control unit 11 decides a point on the image defining the target object (or main object) to be photographed, for which the focus aid display is to be displayed (hereinafter referred to as "display point") (step S60). This point may be determined, for example, from distance amounts of the measurement points. For example, the signal processing/control unit 11 can set the display point to correspond to the closest object, or the closest object at the center portion of the image. As another example, the signal processing/control unit 11 can set the display point in response to the photographer's instruction for manually defining a target (main) object. As an alternative to setting the display point based on the measurement result, the signal processing/control unit 11 may set a point determined as being out of focus as the display point. The display point may also be changed automatically in response to panning, tilting, face-tracking, moving-subject tracking and the like. Alternatively the signal processing/control unit 11 may place multiple target points (display points) automatically based on a result of multipoint focusing or image recognition.

Figure 15:
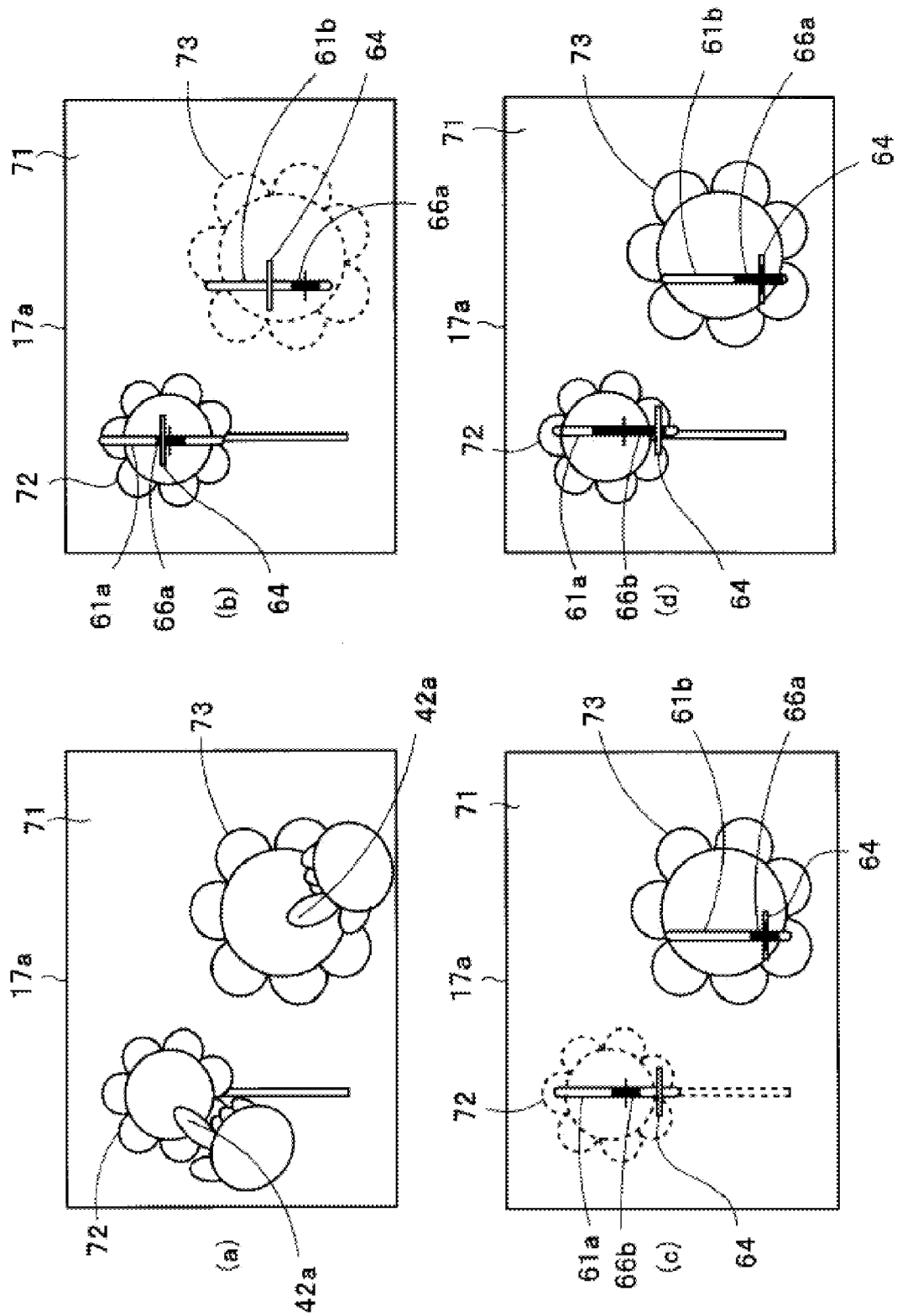
FIGS. 15 (a) to (d) are explanatory diagrams for illustrating an operation of the second embodiment.

FIG. 15 (a) shows an example in which the display point is designated by the photographer. More specifically, a live view image 71 is displayed in the display screen 17a. The live view image 71 is obtained by capturing an image including two flowers. Images 72 and 73 of the two flowers are displayed in the live view image 71. The flower corresponding to image 73 is relatively near the photographing apparatus, and the flower corresponding to image 72 is relatively far from the photographing apparatus.

The photographer touches two positions where he or she wants to perform focusing control in the live view image 71 displayed on the display screen 17a with an index finger 42a. FIG. 15 (a) shows that the photographer has touched positions of the live view display 71 corresponding to the images 72 and 73.

The touch operation is detected by the touch panel 18 and then sent to the signal processing/control unit 11. The focus aid generation unit 11e obtains information regarding the user designated point(s), such as the object distance and defocus amount obtained by the distance and focusing calculation unit 11c and the minimum photographing distance, infinite photographing distance, rear depth of field and front depth of field obtained by the lens information calculation unit 11d.

The focus aid generation unit 11e generates the display data for the focus aid display based on the obtained information and then sends the information to the display control unit 11a. Thus, the display control unit 11a displays the focus aid display. (See step S61 of FIG. 6(b).) FIG. 15 (b) shows this state, where focus aid displays 61a and 61b are displayed at the two display points, respectively, in the live view image 71. The focus aid displays 61a and 61b are displayed in a manner similar to the focus aid display described above with respect to FIG. 9 (excepting that they omit the gauge display 62), and are therefore common elements are designated by same reference numerals.

In FIGS. 15(b) and (c), the images 72 and 73 depicted in dashed-line indicates an out-of focus state. The distance and focusing calculation unit 11c can perform focusing calculation in real time based on AF signal from pixels near a designated point. By referring to the focus aid displays 61a and 61b, the photographer can recognize the information regarding the current focus, focus position (object distance), rear and front depth of field, defocus amount and the like regarding each display point (focusing point).

In FIG. 15(b), the out-of focus state of the image 73 is readily apparent due to the dashed-lines. However, without the focus aid displays, the in-focus state of an object within an actual live view image is not always so apparent to the photographer. Fortunately, the focus state of each object can be easily recognized using the focus aid displays 61a and 61b. The focus aid display 61a shows that an object in the back corresponding to the image 72 is in-focus, and the focus aid display 61b shows that another object in the front corresponding to the image 73 is out of the rear depth of field at a close distance.

Referring to step S62 of FIG. 6(b) that the signal processing/control unit 11 determines whether or not a user operation, such as focusing, has been performed. For example, when a touch panel operation or rotating operation of the operation ring 22a is performed, the signal processing/control unit 11 detects the operation. (See step S63 of FIG. 6(b).) The signal processing/control unit 11 then updates a lens state, such as zoom and focus, in response to the user's operation. (See step S64 of FIG. 6(b).)

In response to the user's operation, the distance and focusing calculation unit 11c and lens information calculation unit 11d calculate the acceptable diameter of circle of confusion, depth of field, focal length and the like again, and the focus aid generation unit 11e updates the focus aid display using these recalculated values. (See step S65 of FIG. 6(b).) The processes of steps S56 to S65 of FIG. 6(b) may be repeated at several m-sec to 100 m-sec intervals until a cancel operation of the live view image is determined (See steps S66 and S67 of FIG. 6(b).)

FIG. 15(c) shows that the object in the front which corresponds to the image 73 is focused on by a photographer's manual focus operation or auto focus. The focus aid display 61b shows that the image 73 is in-focus. On the other hand, the focus aid display 61a shows that the object in the back, which corresponds to the image 72, is out of the depth of field and that the image 72 is out of focus.

When the photographer wants to focus on both objects corresponding to the images 72 and 73, he or she can view both of the focus aid displays 61a and 61b, and decide whether and how to adjust the depth of field based on the information depicted in the focus aid displays 61a and 61b. When the photographer stops down the aperture, for example, the distance is measured and the depth is calculated in real time, in response to the aperture reduction operation. Then the focus aid displays 61a and 61b are updated.

FIG. 15 (d) shows a display in this state. Notice that the front and rear depth of field has been widened in response to the aperture being stopped down. The focus aid displays 61a and 61b show that both objects corresponding to the images 72 and 73 are now within the depth of field and in-focus.

As described above, the photographer can readily determined focus deviation based on whether the respective focusing position displays 64 are within the depth of field displays 66a and 66b, and therefore does not need to rely on image blur in the live view image. Accordingly the focus deviation and defocus direction can be definitely determined even when focus deviation is not obvious in the image itself. Additionally, the photographer can determine whether it is possible to relatively easily adjust the focus by adjusting the depth of field, based on positional relationship between the focusing position displays 64 and depth of field displays 66a and 66b and the like. The depth of field displays 66a and 66b are changed in real time in response to the photographer adjusting the aperture. Accordingly the photographer can confirm when the focusing position display 64 is within the depth of field, and the focus aid displays 61a and 61b help the photographer to adjust the focus and aperture appropriately for focusing.

The accuracy of focusing calculation results may be decreased when using phase difference AF pixels when the aperture is too small or at a minimum. Therefore, normally image capturing used to generate the live view display is performed with a full-open aperture, but photographing (to record a still image) is performed in an aperture state for actual photographing, which may be provided to the photographer via the preview display. As a result, an effect on the depth of field caused by the aperture cannot be checked in some live view images. On the other hand, according to a second embodiment, the amount of the depth of field is obtained by the lens information calculation unit 11d. In this way, the effect caused by the aperture can be easily checked by the depth of field displays 66a and 66b without decreasing the accuracy of focusing calculation.

Sometimes the photographer wants to focus on an object and defocus on another object. For this case, the photographer can refer the depth of field displays 66a and 66b so that he or she can relatively easily adjust both the focus and aperture to obtain the desired photographic effect.

Additionally, a message for how to adjust the focus and/or aperture may be displayed by the display control unit 11a because an adjustment method for focusing may be obtained based on signals from the distance and focusing calculation unit 11c and lens information calculation unit 11d.

Figure 16:
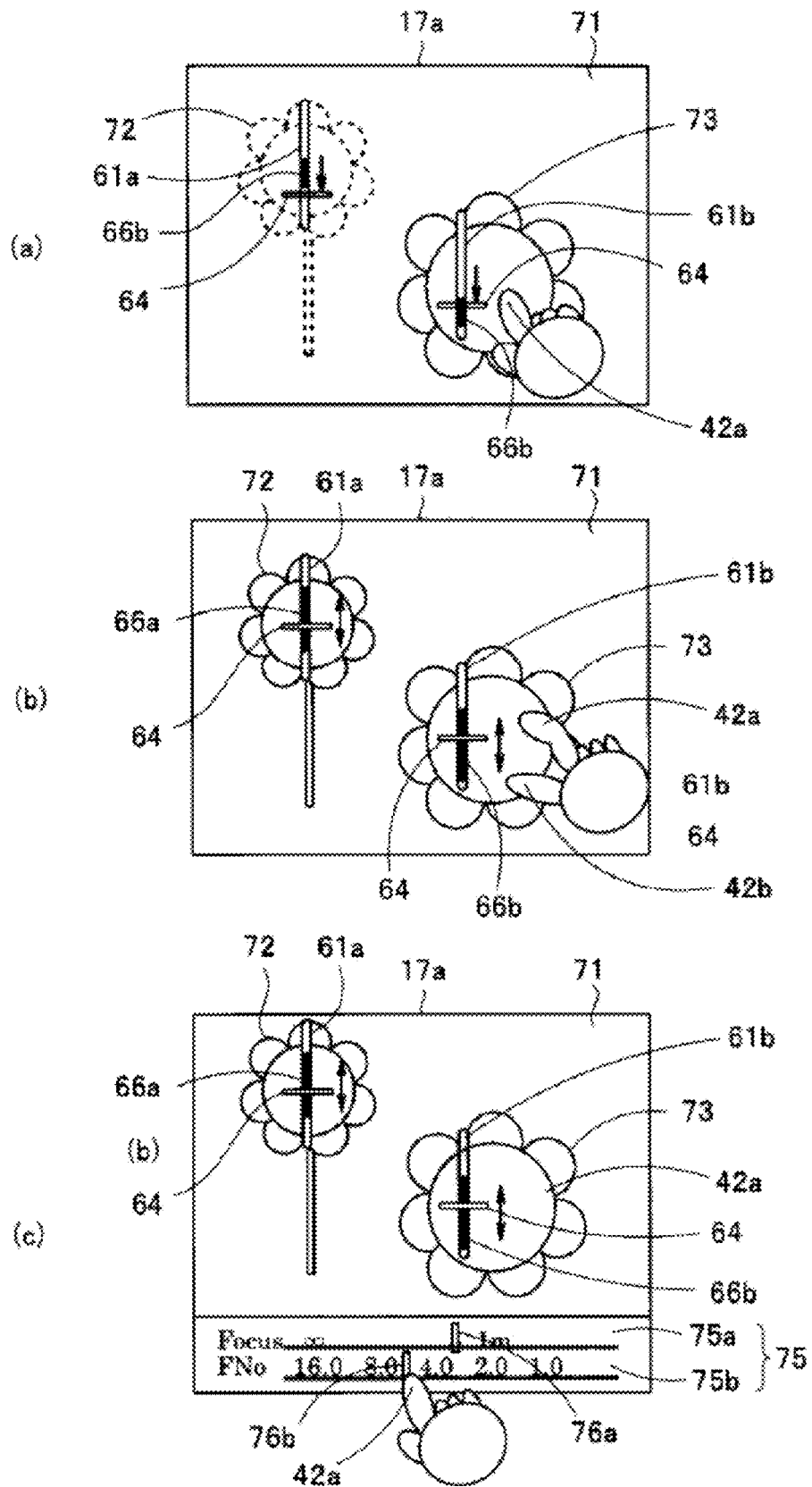
FIGS. 16 (a) to (c) are explanatory diagrams for illustrating an operation of the second embodiment.

FIGS. 15(a)-(d) illustrated an example of how the focus aid displays 61a and 61b can be used to help a photographer adjust the focus and aperture mainly in response to the operation of the operation ring 22a. FIGS. 16 (a) to (c) illustrate examples of how the focus and aperture can be adjusted by a GUI operation of the touch panel 18. In FIGS. 16 (a) to (c), the images 72 and 73 and focus aid displays 61a and 61b are displayed in the live view image 71, as was the case in FIGS. 15 (b) to (d).

FIG. 16 (a) shows an operation example of focus adjustment. In FIG. 16 (a), the photographer is about to perform a slide operation, using a finger, on the display screen 17a. An arrow shows a direction of the slide operation. The signal processing/control unit 11 adjusts focusing based on the direction and amount of the photographer's slide operation, and then updates the focus aid displays 61a and 61b based on the adjustment result. In FIG. 16 (a), the photographer has slid the finger downward in a vertical direction and then the current focusing position has been moved to a close distance and the focusing position display 64 has been slid downward.

FIG. 16 (b) shows an operation example of aperture adjustment. In FIG. 16 (b), the photographer is about to perform a two finger pinch operation on the display screen 17a. An arrow shows a direction of the pinch operation. In this example, the photographer performs a pinch open operation. (Note that the photographer could perform a pinch close operation.) The signal processing/control unit 11 adjusts the aperture based on the direction and amount of the photographer's two finger pinch operation, and then updates the focus aid displays 61a and 61b based on the adjustment result. In FIG. 16 (b), the photographer has performed the pinch open operation by widening fingers 42a and 42b to reduce the current aperture (increase the f-stop). As a result, the depth of field displays 66a and 66b have been widened since a smaller aperture results in a larger depth of field.

FIG. 16 (c) shows an operation example of focus and aperture adjustment. FIG. 16 (c) shows that the photographer controls the focus and aperture using an operation display 75 provided at a bottom of the display screen 17a. The operation display 75 includes a focus adjustment operation display 75a in an upper part and an aperture adjustment operation display 75b in a lower part. Operation bars 76a and 76b are displayed on the focus adjustment operation display 75a and aperture adjustment operation display 75b, respectively. The photographer may perform a slide operation using his or her finger 42a to change display positions of the operation bars 76a and/or 76b, thereby causing the focus and aperture to be adjusted.

As described above, according to the second embodiment, the focus aid displays for multiple objects are possible, in addition to the same effects as the first embodiment. Additionally, a state of change in focusing and depth of field of each object, and a change in the width of the front and rear depth of field, can be instinctively recognized by the photographer in real time as he or she adjusts focusing and/or adjusts aperture. Therefore, the photographer can take advantage of such displays and adjustments to achieve a desired photographic expression, for example by using image blur and/or the depth of field. This allows the quality of a photograph to be improved. Additionally, the state of the depth of field due to the state of the aperture can be easily recognized by the photographer.

Modification

Figure 17:
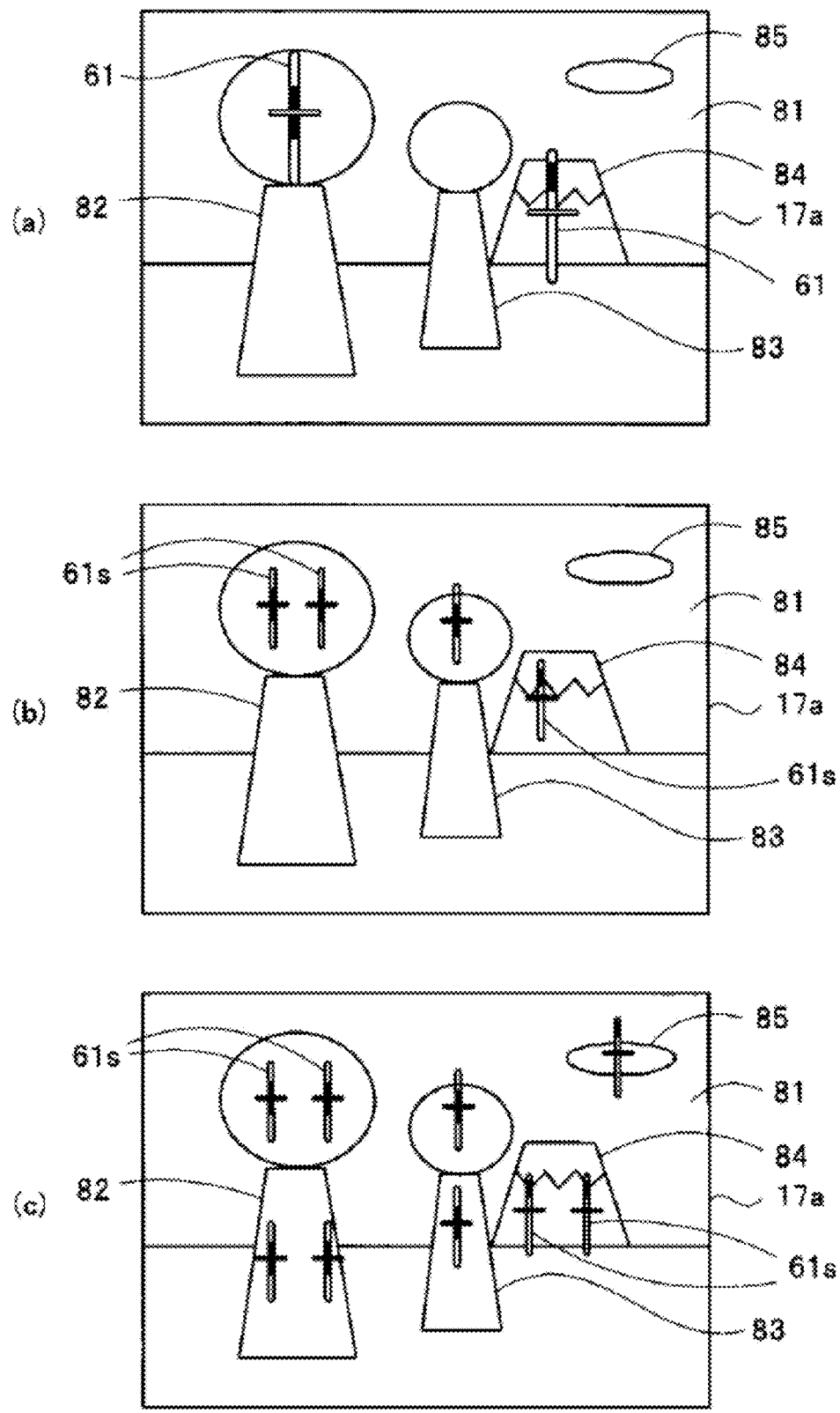
FIGS. 17 (a) to (c) are explanatory diagrams for showing a modification.

FIGS. 17 (a) to (c) are explanatory diagrams for showing modifications to the example embodiments described above. Each of FIGS. 17(a)-(c) shows an example in which a size of the focus aid display is changed depending on the number of selected focusing points (display point) and/or placement. In each of FIGS. 17(a)-(c), a live view image 81 is displayed in the display screen 17a. In the live view image 81, images 82 and 83 are of people, an image 84 is of a mountain and image 85 is of a cloud. In FIG. 17 (a), focus aid displays 61 for the person 82 and mountain 84 are displayed.

On the other hand, in FIG. 17 (b), the number of points at which to display the focus aid displays is increased from that of FIG. 17 (a). Thus, in FIG. 17(b), focus aid displays 61s having sizes reduced from those of the focus aid displays 61 of FIG. 17(a), are used.

FIG. 17 (c) shows an example where more focus aid displays 61s are displayed. The example of FIG. 17 (c) shows that relatively many display points have been selected. This may occur, for example, when a camera automatically selects a point based on the result of focusing calculation. The display point(s) may be automatically set by, for example, by any automatic means of selecting objects of interest such as person determination by detecting eyes in a face, main object extraction by determining a distance, edge, main object extraction by detecting a color and exclusion of a low-contrast object.

Figure 18:
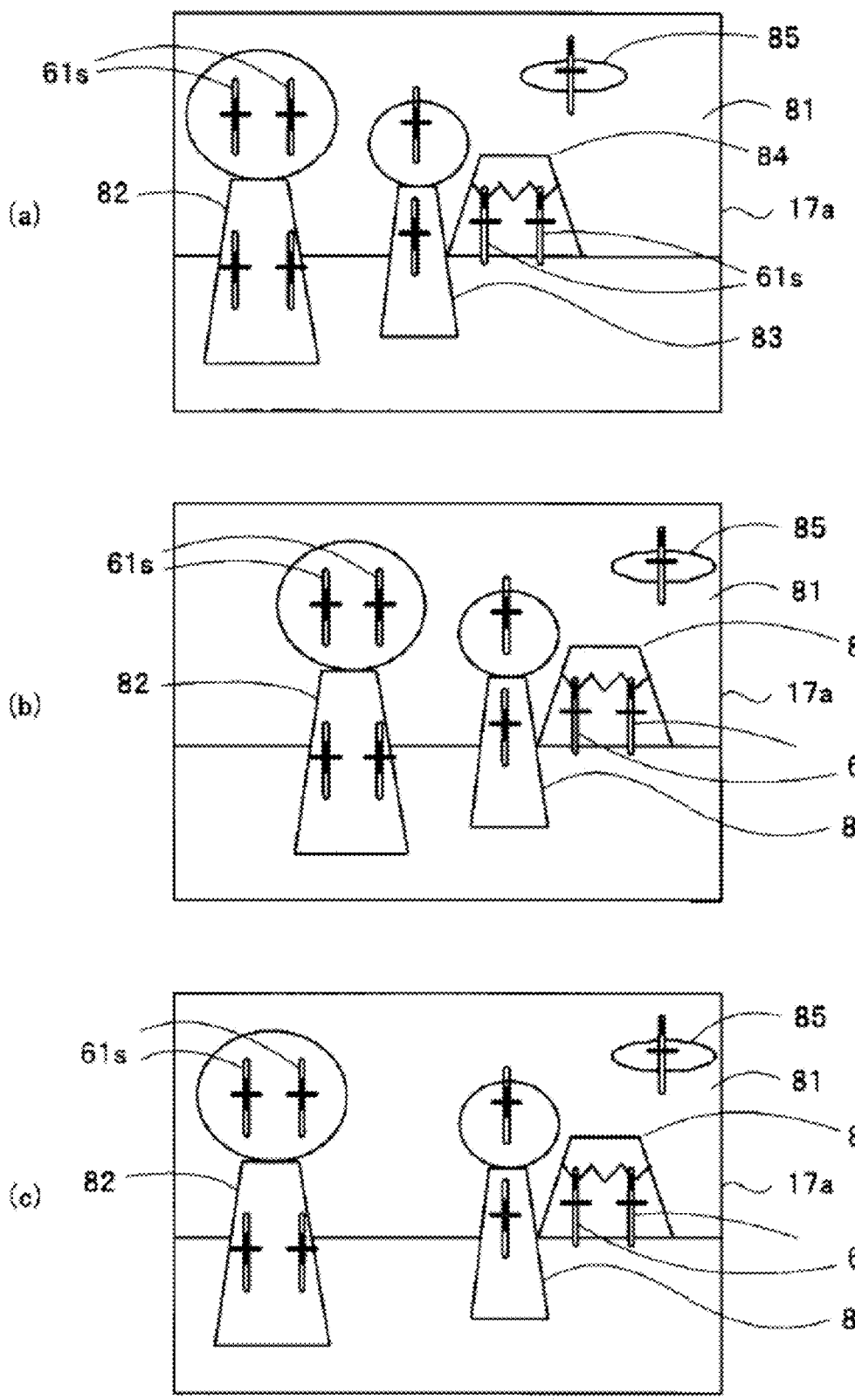
FIGS. 18 (a) to (c) are explanatory diagrams for showing another modification.

FIGS. 18 (a) to (c) are explanatory diagrams for showing another modification of the above-described embodiments.

In each of FIGS. 18(a)-(c), the same live view image 81 as in FIGS. 17(a)-(c) is displayed. FIGS. 18(a)-(c) show examples where the photographer performs zooming, panning, titling and the like, while the focus aid display is displayed. In this case, although the objects move (due to zooming, panning, and/or tilting) during live view capturing, it is possible to automatically change the positions to display the focus aid for each object. This may be done, for example, by face detection, using a moving-subject tracking algorithm, etc.

The live view image 81 of FIG. 18 (b) shows that a camera has panned in a right direction from the state shown in FIG. 18 (a). Even though the photographer has panned the camera, the focus aid displays 61s remain displayed at each position corresponding to each of the objects. FIG. 18 (c) shows an example where the object corresponding to the image 82 has moved to the left from the state shown in FIG. 18 (b). Again, notice that the focus aid displays 61s remain displayed at each position corresponding to each of the objects.

Figure 19:
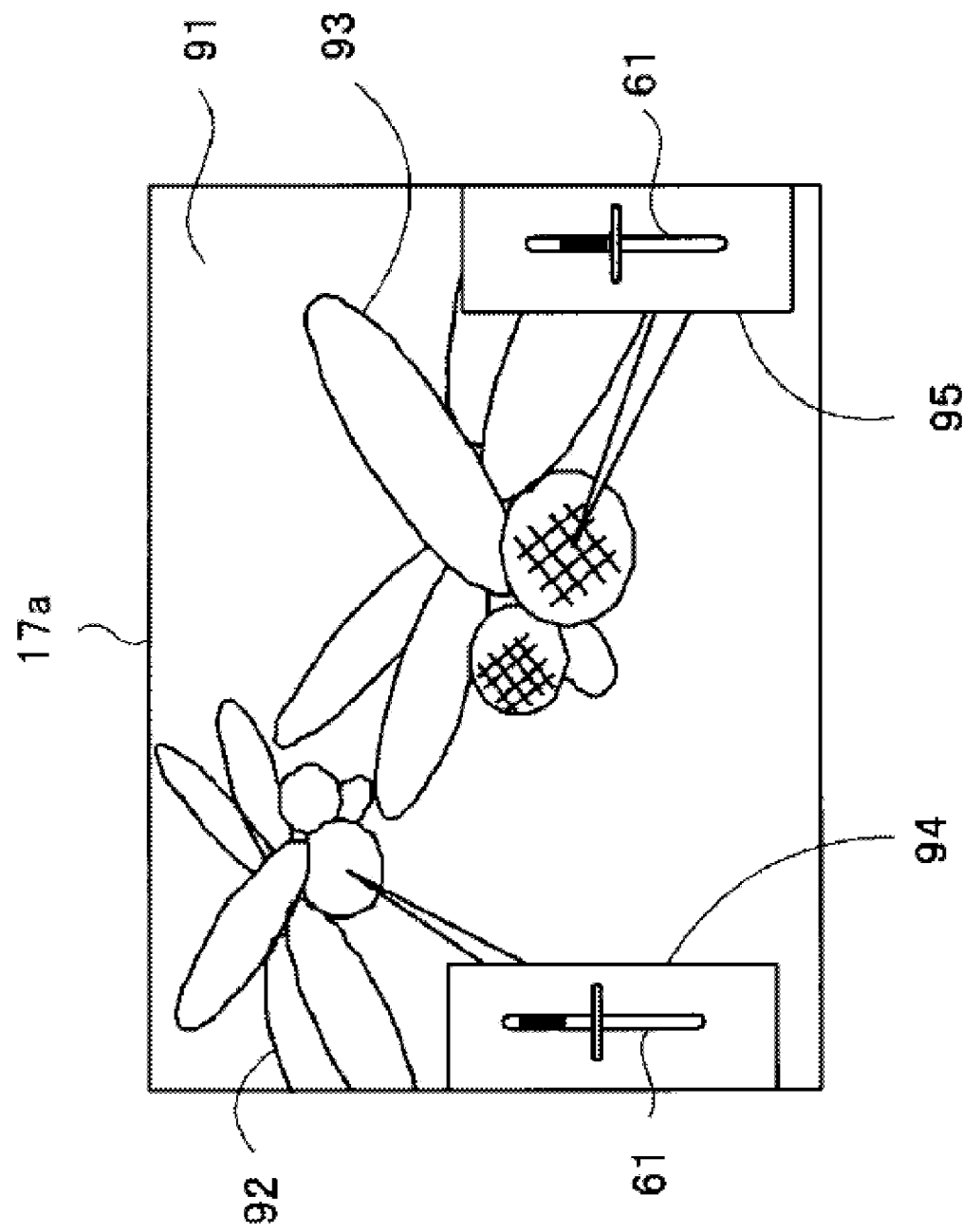
FIG. 19 is an explanatory diagram for showing another modification.

FIG. 19 is an explanatory diagram for showing a further another modification to the above-described embodiments. According to the above-described examples, the focus aid displays were added on the image of the object. Unfortunately, this may obstruct soothe photographer's visibility of the object. On the other hand, in a live view image 91 shown in FIG. 19, balloon display areas 94 and 95 which correspond to images 92 and 93, respectively, are provided offset from the images 92 and 93. The focus aid displays 61 for the images 92 and 93 corresponding each object are displayed in the areas 94 and 95, respectively. By displaying the focus aid displays in this manner, the photographer's visibility of each object is not obstructed.

FIGS. 20 (a) and (b) are explanatory diagrams for showing further modifications to the above described embodiments. More specifically, FIGS. 20(a) and 20(b) illustrate other examples of focus aid displays. A focus aid display 101 shown in FIG. 20 (a) includes a focusing area display 102, focusing position display 103 and depth of field display 104 which extend or move in a transverse (i.e., horizontal) direction, rather than in a vertical direction as used in the foregoing example. This example is effective when a manual focus operation member is a lever which moves right and left, for example. An operation direction can correspond to a direction in which the display changes such that a more instinctive operation is possible.

A focus aid display 105 shown in FIG. 20 (b) is an arc-shaped display including a focusing area display 106, focusing position display 107 and depth of field display 108 which extend or more along a transverse arc. This example is effective when a manual focus operation member is a ring, for example. A rotation direction can correspond to a direction in which the display changes such that a more instinctive operation is possible.

Further, with the one embodiment of the invention, a device for taking pictures has been described using a digital camera, but as a camera it is also possible to use a digital single lens reflex camera or a compact digital camera, or a camera for movie use such as a camcorder, and further to have a camera that is incorporated into a mobile phone, a mobile information terminal (PDA: Personal Digital Assistant), game console, etc. Example embodiments consistent with the present invention also may be adapted to an industrial or medical optical apparatus. With such a device, an observation apparatus and display apparatus, capable of observing an image in-focus accurately, can be provided, as well as a photographing apparatus.

The present invention is not limited to the specific example embodiments described above, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

Regarding the operation flow in the patent claims, the specification and the drawings, for the sake of convenience description has been given using words representing sequence, such as "first" and "subsequently", but at places where it is not particularly described, this does not mean that implementation must be in this order. The steps included in the operation flow may be omitted as long as each step does not affect the essence of the present invention.

Most control and functions mainly described in the flowcharts of the techniques described herein may be set by a program. A computer reads and executes the program to realize the above-described control and functions. The program can be configured by wholly or partly recording or storing, as a computer program product, on a portable medium like a floppy disk, CD-ROM, non-volatile (and non-transitory) memory or the like, or on a (non-transitory) storage medium, such as a hard disk or volatile memory. Alternatively, the program can be wholly or partly distributed or provided via a communication network. The display apparatus in the above exemplary embodiments can be readily implemented by a user downloading the program via the communication network and installing it on a computer, or by installing on a computer from a storage medium.

What is claimed is:

1. A control method for displaying focus state information, the control method comprising:
   obtaining information of a shortest photographing distance and an infinite distance based on a photographing lens information of a lens connected with a photographing apparatus;
   calculating a current focusing position, wherein the current focusing position is determined based on a current position of the photographing lens;
   obtaining information of a first object position, wherein the first object position corresponds to a distance from the photographing apparatus to a target object identified within an image being captured;
   generating first display data for focus aid display which indicates a relative positional relationship of the shortest photographing distance, the infinite distance, the current focusing position, and the first object position;
   displaying the display data in association with the image being captured;
   obtaining information of a second object position, wherein the second object position corresponds to a distance to a second target object identified within an image being captured; and
   generating second display data for a second focus aid display which indicates a relative positional relationship of the shortest photographing distance, the infinite distance, the current focusing position, and the second object position,
   wherein the focus aid display is provided adjacent to or over the target object, and second focus aid display is provided adjacent to or over the second target object.

2. The control method according to claim 1, wherein a size of display of each of the focus aid displays, which indicates a focusing range obtained based on the photographing lens information, is normalized.

3. The control method according to claim 1, further comprising:
   obtaining information of depth of field corresponding to each of the first object position and the second object position,
   wherein the first display data further indicates the obtained depth of field information corresponding to the first object position and the second display data further indicates the obtained depth of field corresponding to the second object position.

4. The control method according to claim 1, wherein the focusing position is for a given point designated by a user.

5. The control method according to claim 1, wherein the act of displaying displays each of the first display data and the second display data overlaid on the image which is being captured.

6. A display apparatus comprising:
   (a) an image sensor which captures an object via a photographing lens and obtains the captured image;
   (b) a communication circuit which obtains (1) information of a shortest photographing distance and an infinite distance based on the information regarding the photographing lens, (2) a current focusing position, wherein the current focusing position is determined based on a current position of the photographing lens, (3) information of a first object position, wherein the first object position corresponds to a distance from the display apparatus to a first target object identified within the image being captured, and (4) information of a second object position, wherein the second object position corresponds to a distance to a second target object identified within an image being captured; and
   (c) a control circuit which (1) generates display data for a focus aid display which indicates a relative positional relationship of the shortest photographing distance, the infinite distance, the current focusing position, and the first object position, (2) generates second display data for a second focus aid display which indicates a relative positional relationship of the shortest photographing distance, the infinite distance, the current focusing position, and the second object position, and (3) causes a display to display the focus aid display adjacent to or over the target object and to display the second focus aid display adjacent to or over the second target object.

7. The display apparatus according to claim 6, wherein the control circuit normalizes a display size of an element indicating a focusing range in each of the focus aid displays obtained based on the photographing lens information.

8. The display apparatus according to claim 6, wherein the communication circuit further obtains information of depth of field of the first object position and depth of field of the second object position.

9. The display apparatus according to claim 6, wherein the current focusing position is defined at a point in the captured image manually designated by a user.

10. The display apparatus according to claim 6, wherein the control circuit causes the display to add each of the focus aid display and the second focus aid display on a display of the captured image.

11. A non-transitory computer-readable recording medium storing processor executable instructions which, when executed by a least processor, to perform a method comprising:

obtaining information of a shortest photographing distance and an infinite distance based on a photographing lens information of a lens connected with a photographing apparatus;
calculating a current focusing position, wherein the current focusing position is determined based on a current position of the photographing lens;
obtaining information of a first object position, wherein the first object position corresponds to a distance from the photographing apparatus to a first target object identified within an image being captured;
generating first display data for focus aid display which indicates a relative positional relationship of the shortest photographing distance, the infinite distance, the current focusing position and the objet position;
displaying the first display data in association with the image being captured;
obtaining information of a second object position, wherein the second object position corresponds to a distance to a second target object identified within an image being captured; and
generating second display data for a second focus aid display which indicates a relative positional relationship of the shortest photographing distance, the infinite distance, the current focusing position, and the second object position,
wherein the focus aid display is provided adjacent to or over the target object, and the second focus aid display is provided adjacent to or over the second target object.

12. The control method of claim 1 wherein the target object is identified within an image being captured based on a position of a user touch on the image.

13. The control method of claim 1 further comprising:
receiving a user input for changing, in a continuous manner, the current focusing position; and
regenerating display data for focus aid display which indicates a relative positional relationship of the shortest photographing distance, the infinite distance, the current focusing position as changed, and the object position.

* * * * *